(12) United States Patent
Tsai et al.

(10) Patent No.: US 10,687,346 B2
(45) Date of Patent: Jun. 16, 2020

(54) ENCODING AND RESOURCE ALLOCATION FOR CONTROL INFORMATION IN PHYSICAL CHANNEL

(71) Applicant: Mediatek Inc., Hsin-Chu (TW)

(72) Inventors: Lung-Sheng Tsai, Hsinchu (TW); Xiu-Sheng Li, Hsinchu (TW); Weidong Yang, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/148,165

(22) Filed: Oct. 1, 2018

(65) Prior Publication Data

US 2019/0104534 A1    Apr. 4, 2019

Related U.S. Application Data

(60) Provisional application No. 62/586,976, filed on Nov. 16, 2017, provisional application No. 62/577,744, filed on Oct. 27, 2017, provisional application No. 62/567,416, filed on Oct. 3, 2017, provisional application No. 62/566,762, filed on Oct. 2, 2017.

(51) Int. Cl.
$H04W\ 72/12$ (2009.01)
$H04L\ 5/00$ (2006.01)

(52) U.S. Cl.
CPC .......... *H04W 72/1268* (2013.01); *H04L 5/00* (2013.01); *H04L 5/006* (2013.01); *H04L 5/0057* (2013.01); *H04L 5/0007* (2013.01); *H04L 5/0051* (2013.01)

(58) Field of Classification Search
CPC .. H04W 72/1268; H04L 5/006; H04L 5/0057; H04L 5/00; H04L 5/0051; H04L 5/0007
See application file for complete search history.

(56) References Cited

U.S. PATENT DOCUMENTS

| 10,356,802 B2* | 7/2019 | Liu ................. H04W 72/1284 |
| 2009/0232070 A1* | 9/2009 | Muharemovic ....... H04L 1/1671 370/329 |
| 2019/0230647 A1* | 7/2019 | Yang ....................... H04J 13/18 |

FOREIGN PATENT DOCUMENTS

| CN | 101902313 A | 12/2010 |
| CN | 104272690 A | 1/2015 |
| CN | 106067845 A | 11/2016 |

OTHER PUBLICATIONS

International Search Report of PCT/CN2018/109325, dated Jan. 3, 2019.

* cited by examiner

*Primary Examiner* — Dady Chery
(74) *Attorney, Agent, or Firm* — Locke Lord LLP; Tim Tingkang Xia, Esq.

(57) ABSTRACT

A method, a computer-readable medium, and an apparatus are provided. The apparatus may be a UE. The UE obtains M1 modulated symbols to be transmitted on a selected section of a physical uplink shared channel (PUSCH) of the UE, the M1 modulated symbols being for carrying a first category of uplink information. The UE maps J1 modulated symbols of the M1 modulated symbols to occupy each one of J1 resource elements (REs) that are available, in a consecutive (N1−1) symbol periods of the selected section of the PUSCH, for carrying modulated symbols that carries the first category of uplink information. The UE determines a number S1 based on K1 and a number T1. The UE maps K1 modulated symbols of the M1 modulated symbols to occupy K1 REs of the T1 REs such that two adjacent REs among the K1 REs being separated by at least (S1−1) REs.

25 Claims, 16 Drawing Sheets

ENCODING AND RESOURCE ALLOCATION FOR CONTROL INFORMATION IN PHYSICAL CHANNEL

CROSS-REFERENCE TO RELATED APPLICATION(S)

This application claims the benefits of U.S. Provisional Application Ser. No. 62/566,762, entitled "ENCODING AND RESOURCE ALLOCATION FOR UCI IN PHYSICAL CHANNEL" and filed on Oct. 2, 2017, U.S. Provisional Application Ser. No. 62/567,416, entitled "UCI OMISSION RULES" and filed on Oct. 3, 2017, U.S. Provisional Application Ser. No. 62/577,744, entitled "METHODS FOR MAPPING UPLINK CONTROL INFORMATION TO PHYSICAL RESOURCES" and filed on Oct. 27, 2017, and U.S. Provisional Application Ser. No. 62/586,976, entitled "METHODS FOR MAPPING UPLINK CONTROL INFORMATION TO PHYSICAL RESOURCES" and filed on Nov. 16, 2017, all of which are expressly incorporated by reference herein in their entirety.

BACKGROUND

Field

The present disclosure relates generally to communication systems, and more particularly, to techniques for resource allocation for control information in physical channel employed by a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE obtains M1 modulated symbols to be transmitted on a selected section of a physical uplink shared channel (PUSCH) of the UE, the M1 modulated symbols being for carrying a first category of uplink information. The UE maps J1 modulated symbols of the M1 modulated symbols to occupy each one of J1 resource elements (REs) that are available, in a consecutive (N1−1) symbol periods of the selected section of the PUSCH, for carrying modulated symbols that carries the first category of uplink information, (N1−1) being a maximum integer that allows J1 to be smaller than M1, K1 being a difference between J1 and M1. The UE further determines a number S1 based on K1 and a number T1, T1 REs being available in a $N1^{th}$ symbol period of the selected section of the PUSCH for carrying modulated symbols that carries the first category of uplink information, the $N1^{th}$ symbol period being subsequent and consecutive to the consecutive (N1−1) symbol periods. The UE maps K1 modulated symbols of the M1 modulated symbols to occupy K1 REs of the T1 REs such that two adjacent REs among the K1 REs being separated by at least (S1−1) REs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
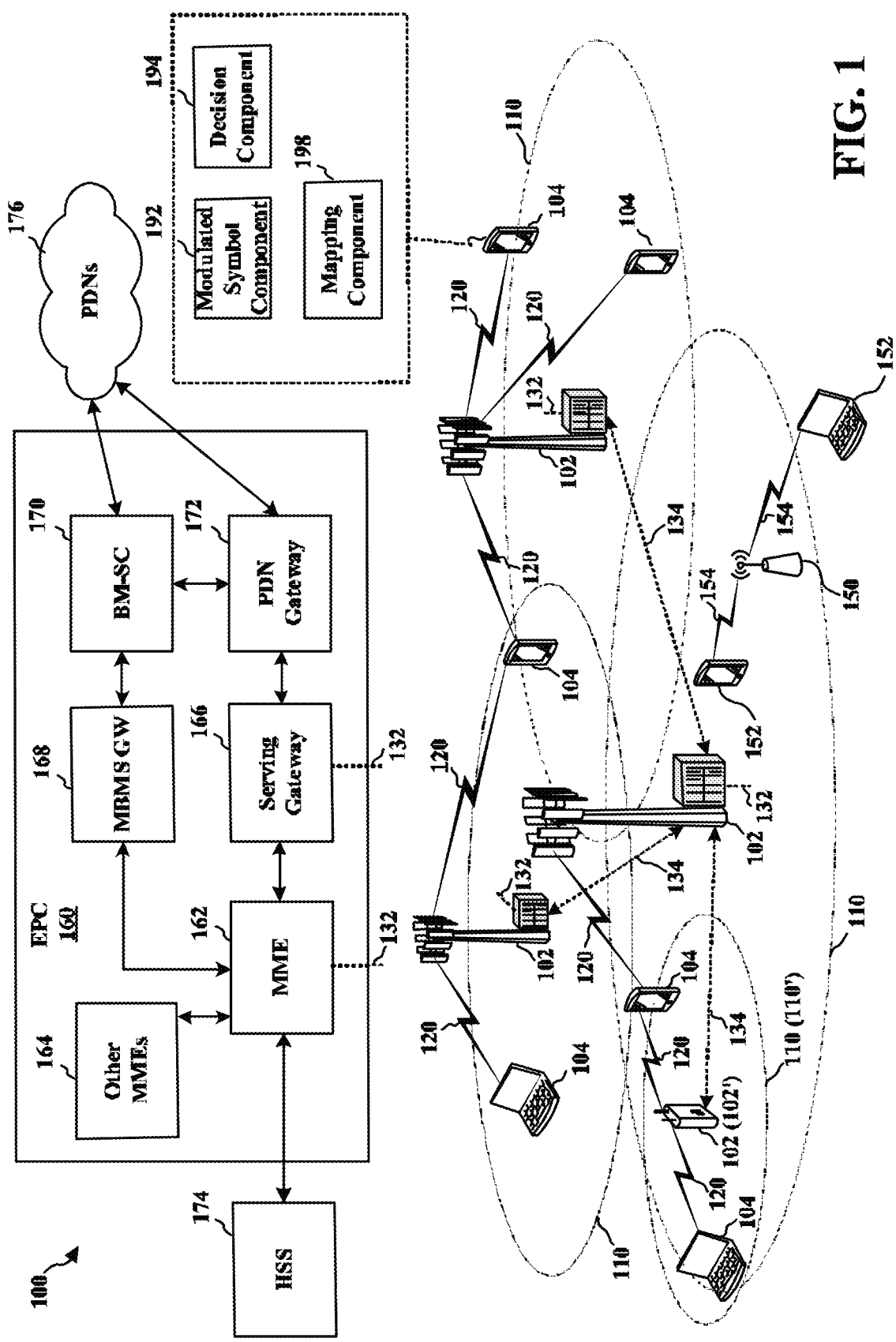
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/ Es 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a modulated symbol component 192, a decision component 194, and a mapping component 198. The modulated symbol component 192 obtains M1 modulated symbols to be transmitted on a selected section of a physical uplink shared channel (PUSCH) of the UE, the M1 modulated symbols being for carrying a first category of uplink information. The mapping component 198 maps J1 modulated symbols of the M1 modulated symbols to occupy each one of J1 resource elements (REs) that are available, in a consecutive (N1−1) symbol periods of the selected section of the PUSCH, for carrying modulated symbols that carries the first category of uplink information, (N1−1) being a maximum integer that allows J1 to be smaller than M1, K1 being a difference between J1 and M1. The decision component 194 determines a number S1 based on K1 and a number T1, T1 REs being available in a N1th symbol period of the selected section of the PUSCH for carrying modulated symbols that carries the first category of uplink information, the N1th symbol period being subsequent and consecutive to the consecutive (N1−1) symbol periods. The mapping component 198 maps K1 modulated symbols of the M1 modulated symbols to occupy K1 REs of the T1 REs such that two adjacent REs among the K1 REs being separated by at least (S1−1) REs.

Figure 2:
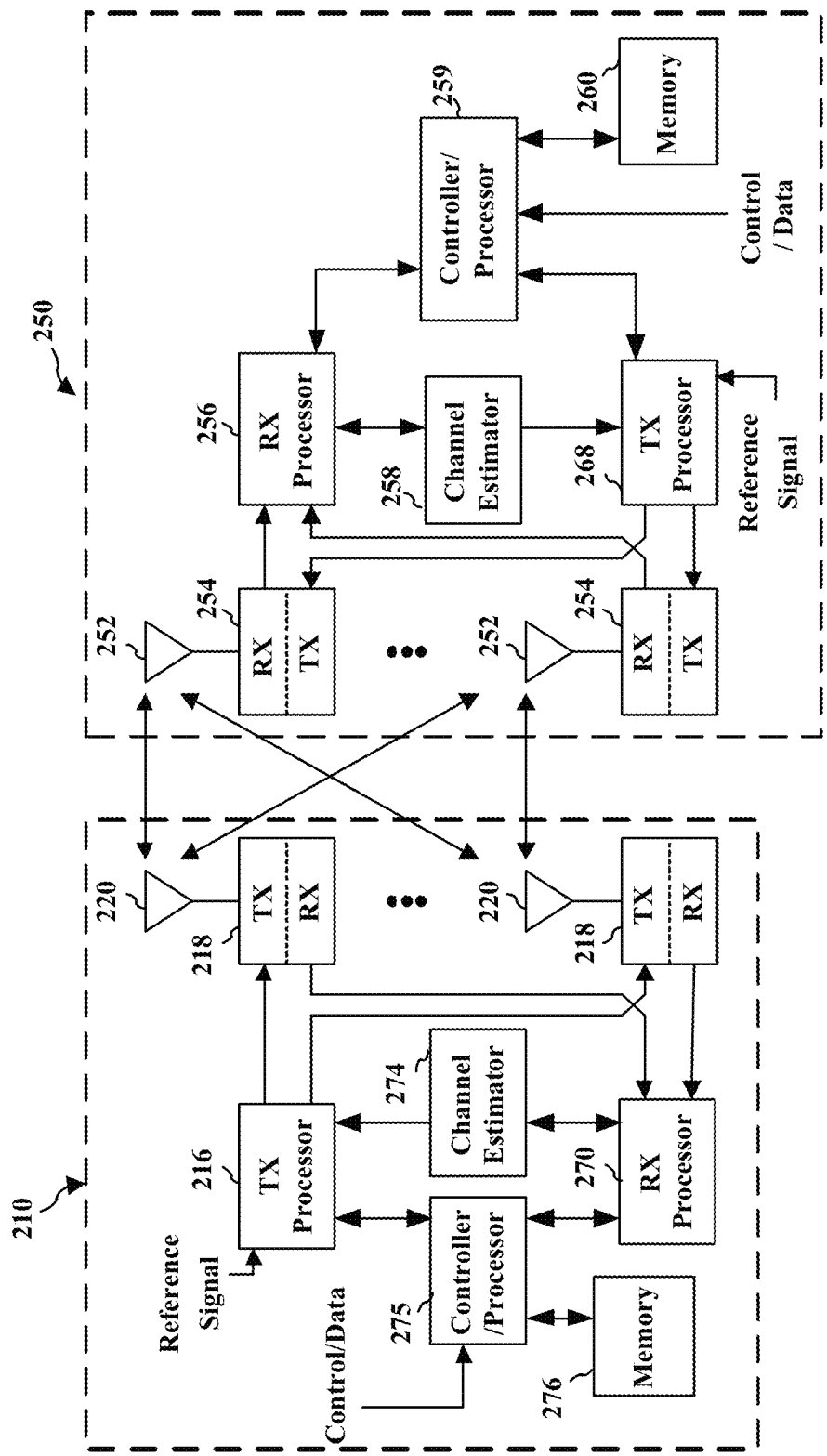
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
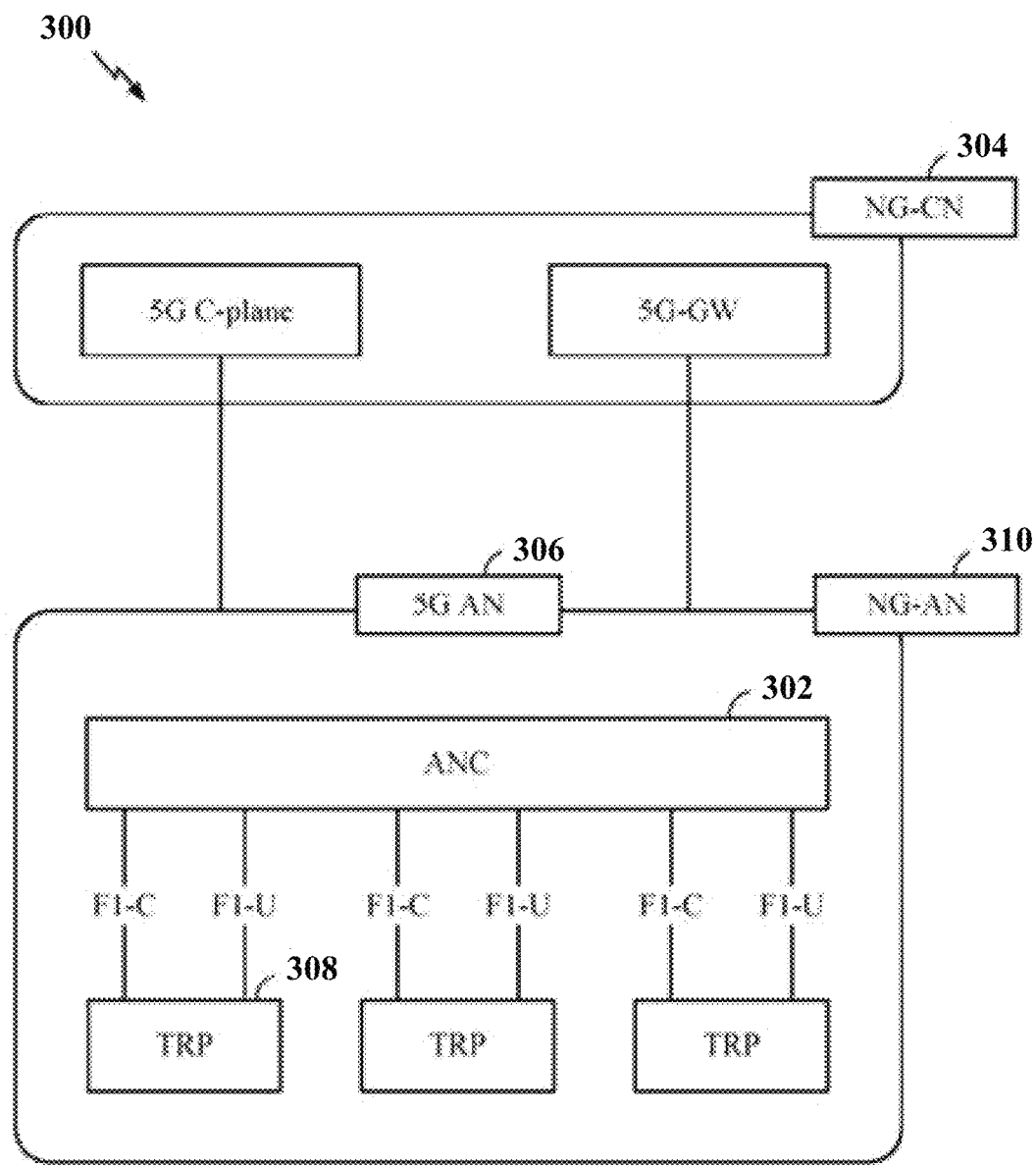
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
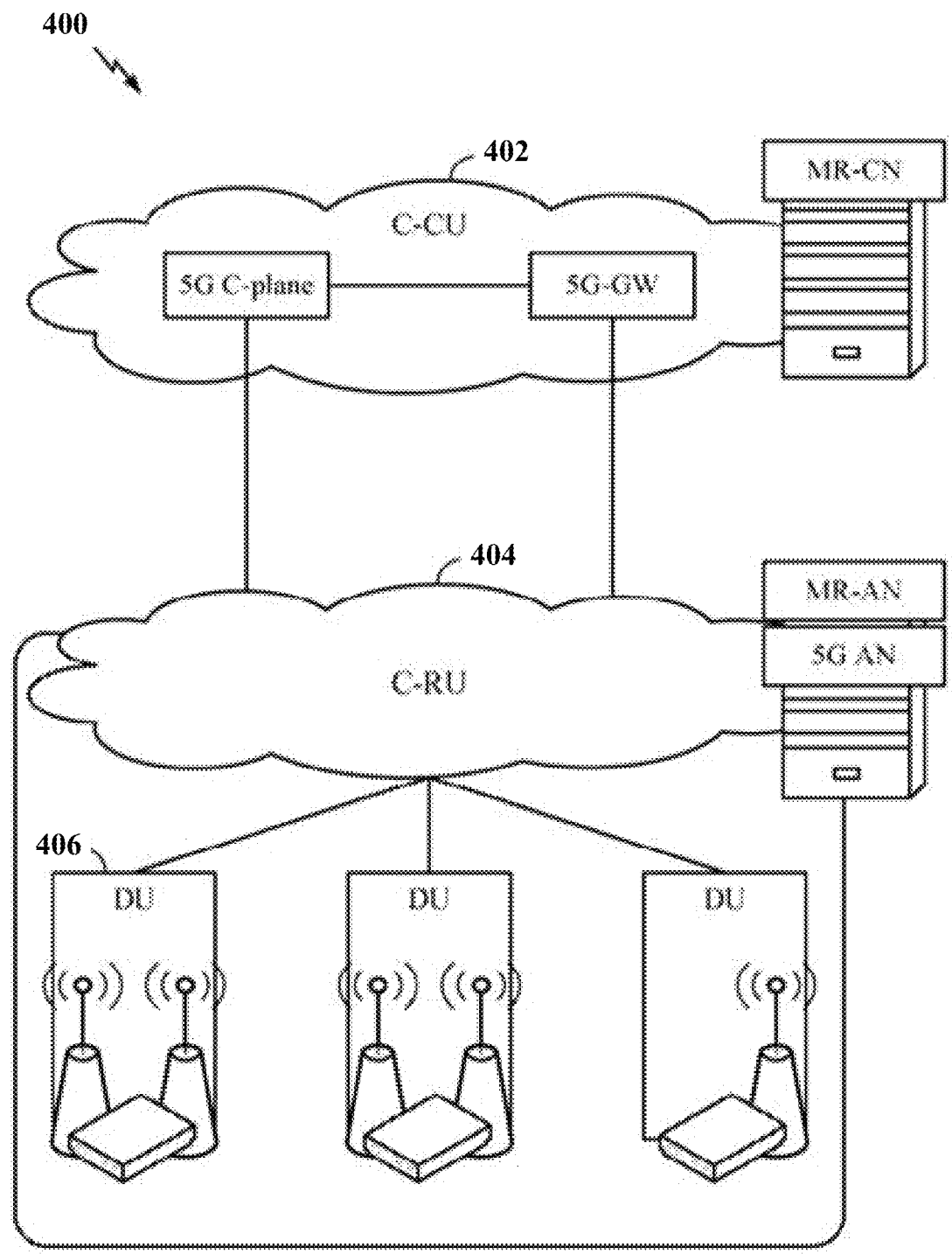
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
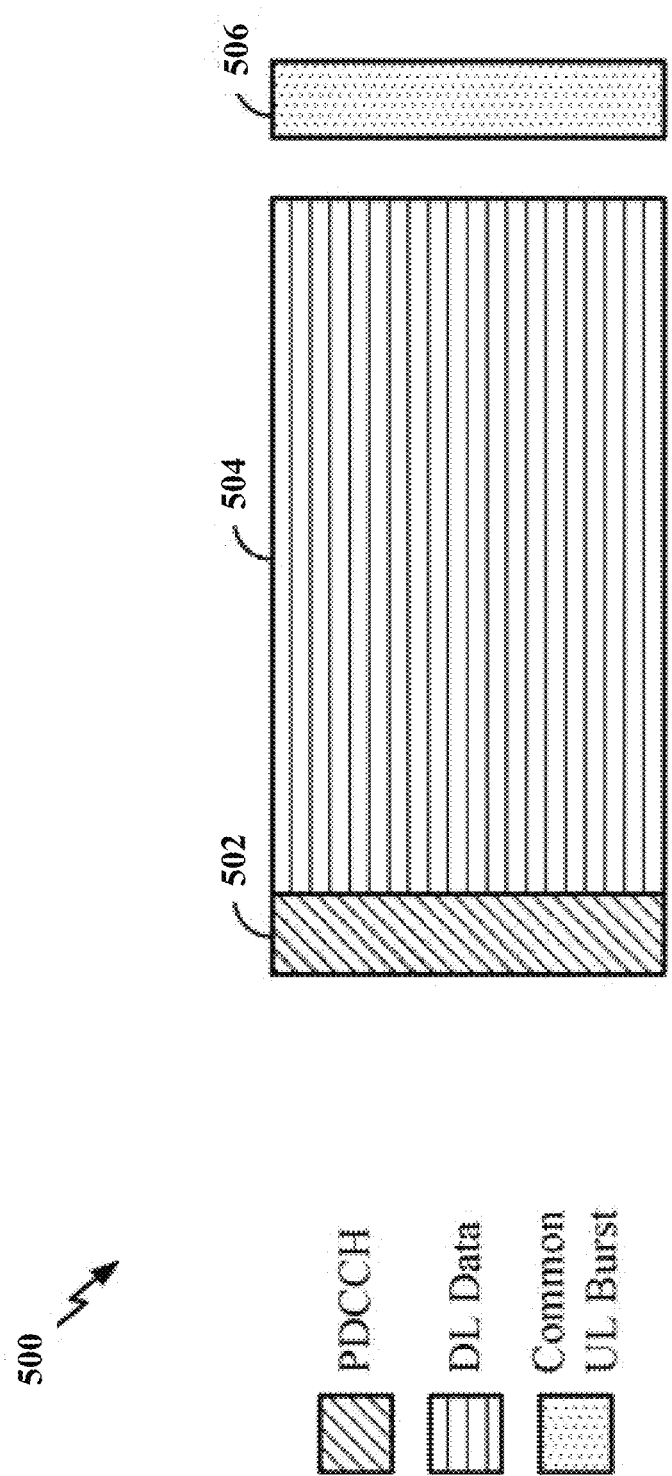
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
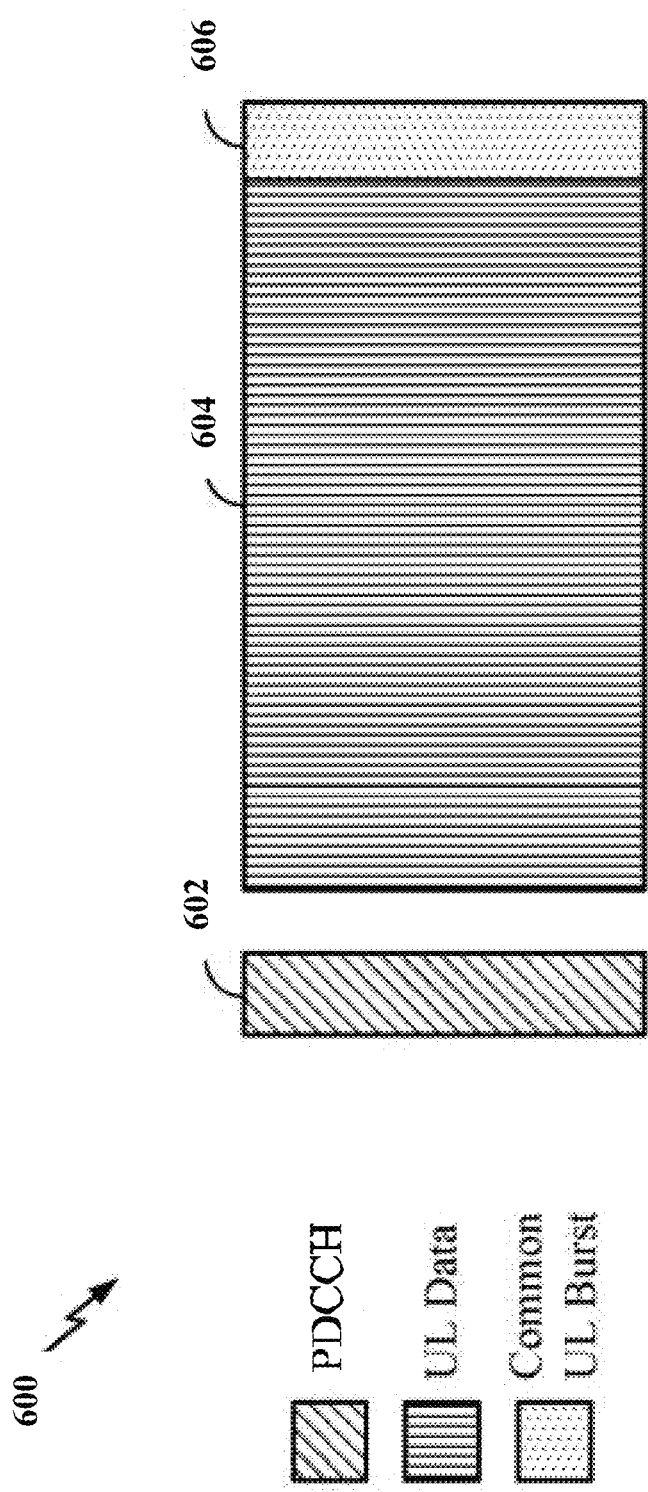
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Channel state information (CSI) reports provide the network with information about the current channel conditions. CSI may include rank indicator (RI), precoder matrix indicator (PMI), channel-quality indicator (CQI), and/or channel state information reference signal (CSI-RS) resource indicator (CRI). A CSI report may have two parts: CSI Part 1 and CSI Part 2. CSI Part 1 contains, among other things, RI, CQI and indication of the number of non-zero wideband amplitude coefficients, and may have a fixed payload size. CSI Part 2 contains the remaining portion of CSI.

Figure 7:
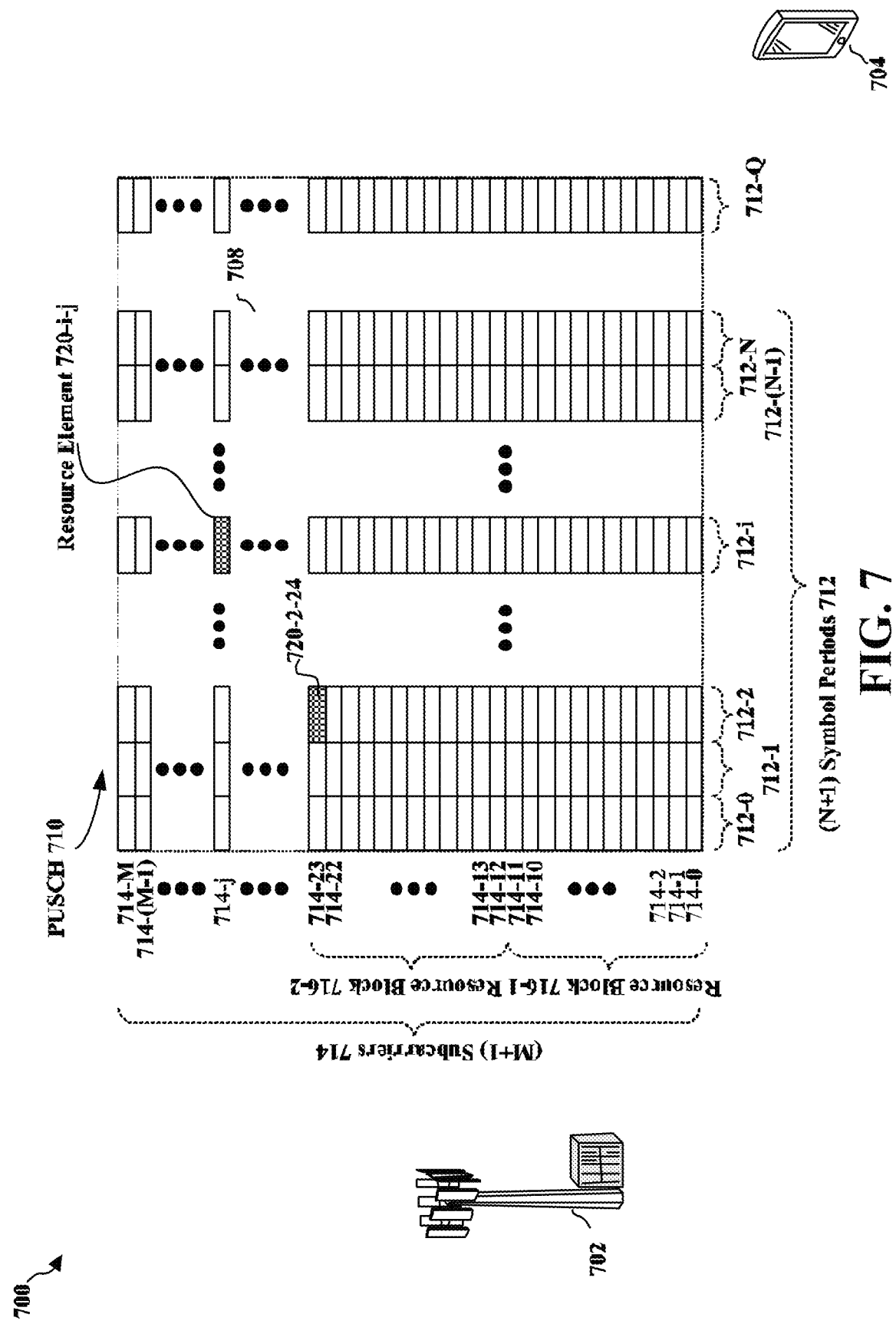
FIG. 7 is a diagram illustrating communications between a base station and UE.

FIG. 7 is a diagram 700 illustrating communications between a UE 704 and a base station 702. The UE 704 needs to send uplink information such as acknowledgments (ACK)/negative acknowledgments (NACK), unlink control information (UCI) including CSI, and user data to the base station 702. In this example, the UE 704 is allocated a PUSCH 710 for transmitting the uplink information. The PUSCH 710 contains (M+1) subcarriers 714-0 to 714-M and (Q+1) symbol periods 712-0 to 712-Q. The UE 704 generates modulated symbols carrying UCI and then maps the modulated symbols to resource elements (REs) in the PUSCH 710. A resource element 720-$i$-$j$ is the resource element in the symbol period 712-$i$ and on the subcarrier 714-$j$, where i is an integer ranging from 0 to Q and j is an integer ranging from 0 to M. Further, twelve subcarriers constitute a resource block. For example, a resource block 716-1 includes the subcarriers 714-0 to 714-11 and a resource block 716-2 includes the subcarriers 714-12 to 714-23.

The design for resource element mapping of UCI for PUSCH-based CSI reporting need to provide both high reliability and low latency for the processing of network. Because of the dependency between CSI Part 1 and CSI Part 2 for PUSCH-based CSI reporting, CSI Part 1 typically has higher priority compared with CSI Part 2, to avoid error propagation. To improve the reliability of UCI, diversity gain may also be utilized by spreading modulated symbols carrying CSI in the frequency domain (e.g., the subcarriers 714-0 to 714-M) and/or in the time domain (e.g., the symbol periods 712-0 to 712-Q) within scheduled physical resource blocks (PRBs) (e.g., the resource blocks 716-1 and 716-2). Because the base station 702 processes the CSI Part 1 and the CSI Part 2 received from the UE 704 sequentially, front-loading UCI in the PUSCH 710 may avoid latency. In addition, considering front-loaded uplink demodulation reference signal (DMRS), front-loaded resource element mapping for CSI Part 1 and CSI Part 2 may be beneficial, because accordingly the CSI Part 1 and the CSI Part 2 are mapped to resource elements close to DMRS.

Figure 8:
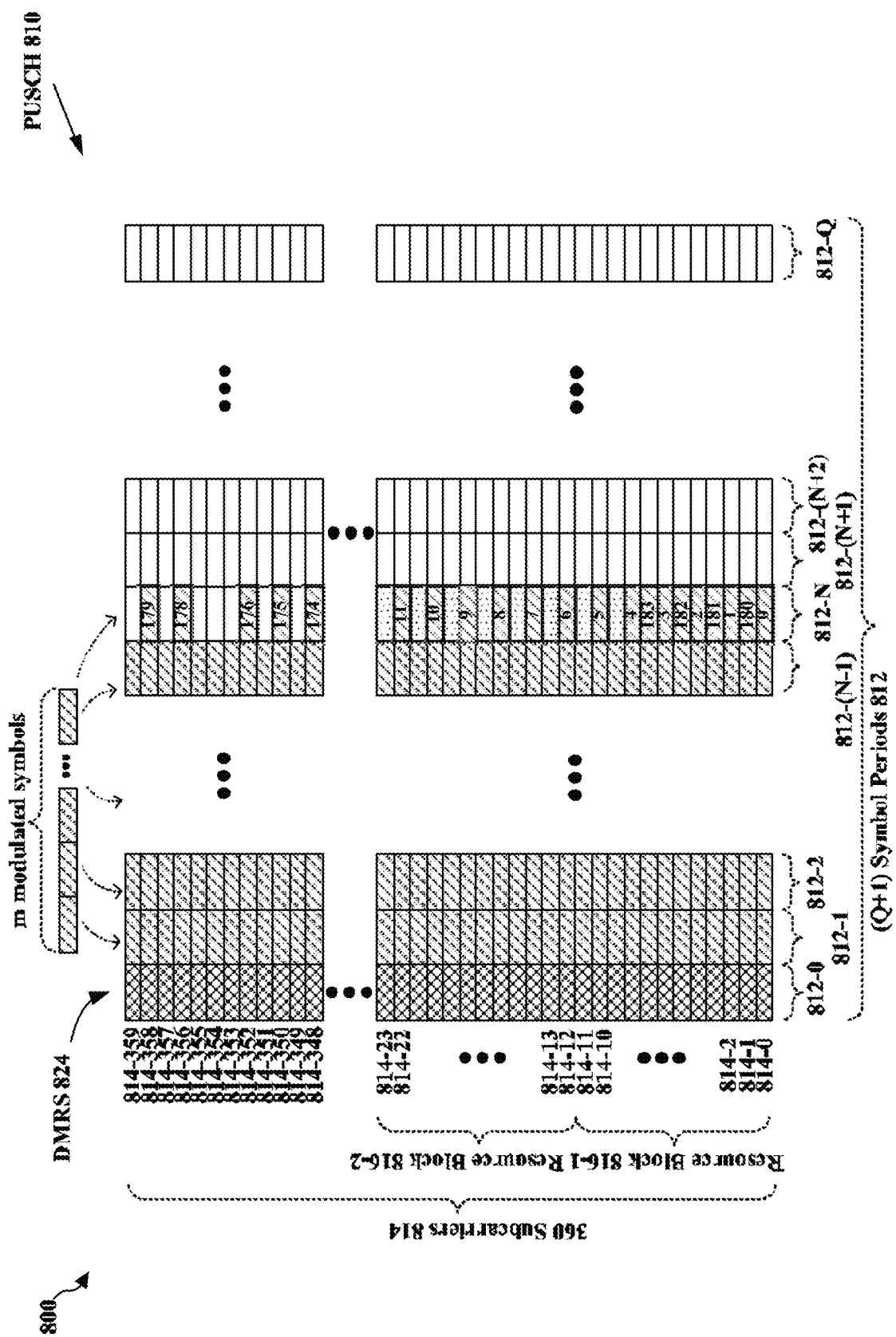
FIG. 8 is a diagram illustrating procedures for transmitting uplink information from a UE to a base station.

Different techniques to map modulated symbols to resource elements within the (N+1) symbol periods 712 and (M+1) subcarriers 714 are explained in detail with the help of FIG. 8.

FIG. 8 is a diagram 800 illustrating procedures for transmitting uplink information from the UE 704 to the base station 702. Similar to the PUSCH 710 shown in FIG. 7, a PUSCH 810 contains 360 subcarriers 814-0 to 814-359 and (N+1) symbol periods 812-0 to 812-Q. In other words, in this example, M subcarriers of FIG. 7 are 360 subcarriers. As described supra, twelve subcarriers constitute a resource block. For example, the resource block 816-1 includes the subcarriers 814-0 to 814-11 and a resource block 816-2 includes the subcarriers 814-12 to 814-23. A resource elements 820-$i$-$j$ is the resource element in the symbol period 812-$i$ and on the subcarrier 814-$j$. In this example, i is an integer ranging from 0 to Q, while j is an integer ranging from 0 to 359.

In certain configurations, modulated symbols carrying UCI are mapped to symbol periods adjacent to a symbol period containing DMRSs (e.g., the symbol period 812-0) to have better channel estimation performance. In this example, DMRSs 824 occupy one or more resource elements in the symbol period 812-0. In another example, the DMRSs 824 may be transmitted in more than one symbol period in a burst. Therefore, the UE 704 may start placing modulated symbols carrying UCI in the symbol period 812-1, which is a symbol period adjacent to the symbol period 812-0, and then sequentially in subsequent symbol periods (i.e., the symbol period 812-1, the symbol period 812-2, etc.) until all modulated symbols carrying UCI are placed in the PUSCH 810.

When the DMRSs 824 are not located in the first symbol period (i.e., the symbol period 812-0) but instead at the later symbol periods, then the symbol period order for mapping modulated symbols may be sorted according to the distance from each symbol period to its closest symbol period(s) containing DMRSs. For example, when DMRSs occupy the symbol periods 812-2 and 812-3, the UE 704 maps modulated symbols carrying UCI by the following order: the symbol period 812-1, the symbol period 812-4, the symbol period 812-0, the symbol period 812-5, the symbol period 812-6, the symbol period 812-7, the symbol period 812-8, . . . , the symbol period 812-N. Except this difference in order, the techniques to map modulated symbols to resource elements are the same as described here.

As described supra, the uplink information may be divided into different categories give different priorities. The UE 704 may be configured to place modulated symbols carrying uplink information with a higher priority in the PUSCH 810 first and then place modulated symbols carrying uplink information with a lower priority. For example, the following categories of uplink information, listed in order of their priorities of from high to low, are: ACK/NACK, CSI Part 1, CSI Part 2, and PUSCH user data.

In this example, for a particular category (e.g., the CSI Part 1), the UE 704 may determine that m modulated symbols are to be placed in the PUSCH 810. That is, m resource elements are needed to carry those modulated symbols in the PUSCH 810.

In a first technique, in order to place the m modulated symbols carrying uplink of a particular category in the PUSCH 810, the UE 704 determines the minimum number N of symbol periods required to provide at least m resource elements to carry the modulated symbols. More specifically, $T_i$ resource elements are available in $i^{th}$ symbol period for carrying the modulated symbols. N is the smallest integer such that:

$$\Sigma_{i=1}^{N} T_i \geq m.$$

For the initial (N−1) symbol periods (e.g., the symbol periods 812-1 to 812-(N−1)), the m modulated symbols are first mapped successively across subcarriers having available resource elements in a symbol period until all available resource elements in the initial (N−1) symbol have been occupied by the modulated symbols. In this example, the UE 704 first maps the m modulated symbols to resource elements in the symbol period 812-0, then to resource elements in the symbol period 812-1, and so on.

In this example, for the $N^{th}$ symbol period (e.g., the symbol period 812-N), $U_N$ modulated symbols of the m modulated symbols left to be mapped into the resource elements in the $N^{th}$ symbol period. The number of the resource elements available in the $N^{th}$ symbol period for the m modulated symbols is $T_N$. In this technique, the UE 704 distributes the $U_N$ modulated symbols to the $T_N$ resource elements available in the $N^{th}$ symbol period. In particular, the UE 704 may determine a step size s, and maps one modulated symbol to a resource element every s resource elements. In other words, there are (s−1) unoccupied resource elements in between two adjacent resource elements occupied by the modulated symbols. In certain configurations, the UE 704 may determine that s is the minimum integer that is greater than or equal to $(T_N/U_N)$. In other words, $$s = \left\lceil \frac{T_N}{U_N} \right\rceil$$

Further, in this example, the available resource elements in the $N^{th}$ symbol period can be indexed from 0 to 359 in accordance with the order of the subcarriers 814-0 to 814-359. As such, resource element indexed as the (k×s+σ) is selected to carry a modulated symbol. k is the integers from 0 to $k_{max}$, inclusive $k_{max}$ is the largest integer such that $k_{max} \times s$ is smaller than $T_N$. σ is an offset selected by the UE 704 and may be 0.

When $U_N$ is greater than ($k_{max}$+1), the UE 704 determines that ($U_N$−$k_{max}$−1) modulated symbols have not been mapped to the resource elements in the $N^{th}$ symbol period. The UE 704 may again select the resource element indexed as the (k×s+σ), as described supra, to carry the remaining modulated symbols. The UE 704 determines that a is the index of the first available resource element left in the $N^{th}$ symbol period. The UE 704 may repeat the procedures described supra until all $U_N$ modulated symbols have been placed in the selected resource elements in the $N^{th}$ symbol period.

FIG. 8 shows that, in this example, 183 modulated symbols (i.e., $U_N$ modulated symbols) remain to be placed in the 360 resource elements available in the symbol period 812-N (i.e., the $N^{th}$ symbol period). The UE 704 determines that s is 2, $k_{max}$ is 179, and σ is 0 when mapping the modulated symbols 0 to 179. Accordingly, the UE 704 maps the modulated symbols 0 to 179 to the resource elements indexed as 0, 2, 4, . . . , 358. Subsequently, when mapping the modulated symbols 180 to 183, The UE 704 determines that s is 2, $k_{max}$ is 3, and σ is 1. Accordingly, the UE 704 maps the modulated symbols 180 to 183 to the resource elements indexed as 1, 3, 5, 7.

In certain configurations, the UE 704 may determine that s is the maximum integer that is smaller than or equal to $(T_N/U_N)$. In other words, $$s = \left\lfloor \frac{T_N}{U_N} \right\rfloor$$

After mapping the m modulated symbols carrying uplink information of a particular category (e.g., CSI Part 1) in the resource elements of the symbol periods 812-1 to 812-N, the UE 704 may determine to map modulated symbols carrying uplink information of another particular category (e.g., CSI Part 2) in the resource elements of the symbol periods 812-1 to 812-N by using the techniques described supra.

In a second technique, in this example, there are m modulated symbols to carry UCI for a portion of CSI reporting (e.g., CSI Part 1). The number m may be generated by the UE 704. The way the number m is derived will be discussed in detail later.

Assume that the m modulated symbols are mapped to N symbol periods (e.g., symbol periods 812-1 to 812-N). Under one technique, one way to do this is to divide the m modulated symbols almost uniformly into the N symbol periods (e.g., symbol periods 812-1 to 812-N). More precisely, for the first (N−1) of the N symbol periods, i.e., the symbol periods 812-1 to 812-N, the $i^{th}$ symbol period needs to use $U_i$ resource elements 820-i-j to carry modulated symbols. $U_i$ is calculated by the following equation:

$$U_i = \left\lceil \frac{m}{N} \right\rceil, i = 1, 2, \ldots, i, \ldots, N-1.$$

The last symbol period, i.e., the last symbol period 812-N, needs to use $U_N$ resource elements 820-N-j to carry modulated symbols. $U_N$ is the remaining resources elements needed, calculated by the following equation:

$$U_N = m - (N-1) \times \left\lceil \frac{m}{N} \right\rceil.$$

For example, if m is 75 and N is 10, then $U_1$ to $U_9$ is 8, and $U_{10}$ is 3. In other words, for each of the first (N−1) symbol periods 812-1 to 812-9, eight resource elements need to be assigned to carry modulated symbols; for the last symbol period 812-10, only three resource elements need to be assigned to carry modulated symbols.

Then, under this technique, apply the following two-step approach for each of the N symbol periods, i.e., the symbol periods 812-1 to 812-N.

In the first step of the two-step approach, a step $s_i$ is set for the $i^{th}$ symbol period 812-$i$. More precisely, $s_i$ is calculated by the following equations:

$$s_i = \left\lceil \frac{T_i}{U_i} \right\rceil = \left\lceil \frac{p \times n_{RB}}{\left\lceil \frac{m}{N} \right\rceil} \right\rceil, i = 1, 2, \ldots, i, \ldots, N-1; \text{ and}$$

$$s_N = \left\lceil \frac{T_N}{U_N} \right\rceil = \left\lceil \frac{p \times n_{RB}}{m - (N-1) \times \left\lceil \frac{m}{N} \right\rceil} \right\rceil, i = N.$$

Here, $U_i$ is the number of resource elements 820-$i$-$j$ in the $i^{th}$ symbol period 812-$i$ assigned to carry modulated symbols; $T_i$ is the number of resource elements 820-$i$-$j$ available in the $i^{th}$ symbol period 812-$i$; $n_{RB}$ is the number of resource blocks in the $i^{th}$ symbol period 812-$i$ (like resource blocks 816-1 and 816-2), and p is the average number of unoccupied resource elements 820-$i$-$j$ in one resource block in the $i^{th}$ symbol period 812-$i$ (like resource blocks 816-1). Typically, p is 12 in an unoccupied symbol period. On the other hand, if some of the resource elements (like resource elements 820-$i$-$j$) in one resource block (like resource block 816-1) have already been occupied or assigned for other purposes (e.g., for reference signal like DMRS, acknowledges, scheduling requests etc.), the number p will be smaller than 12 accordingly. If p is 12 and $n_{RB}$ is 30 like in the example illustrated in FIG. 8, then $T_i$ is 360. It should be noted that p may be other integer greater than 0 but other than 12.

It should be noted that alternatively $s_i$ can be calculated by the following equations:

$$s_i = \left\lfloor \frac{T_i}{U_i} \right\rfloor = \left\lfloor \frac{p \times n_{RB}}{\left\lceil \frac{m}{N} \right\rceil} \right\rfloor, i = 1, 2, \ldots, i, \ldots, N-1; \text{ and}$$

$$s_N = \left\lfloor \frac{T_N}{U_N} \right\rfloor = \left\lfloor \frac{p \times n_{RB}}{m - (N-1) \times \left\lceil \frac{m}{N} \right\rceil} \right\rfloor, i = N.$$

In summary, this means $U_i$ resource elements out of the $T_i$ available resource elements in the $i^{th}$ symbol period 812-$i$ are assigned to carry modulated symbols, and a step $s_i$ is calculated depending on $U_i$ and $T_i$. For example, assume that $U_i$ is 8 (i=1, 2, . . . , 9) and $U_N$ (i=N=10) is 3 as mentioned supra, and assume $T_i$ is 360 as mentioned supra, then $s_1$ to $s_9$ is 45 while $s_{10}$ is 120.

In addition, for the $i^{th}$ symbol period 812-$i$, an offset value $\sigma_i$ is set as:

$\sigma_i = i - 1, i = 1, 2, 3, \ldots, N.$

For example, for the symbol period 812-1, $\sigma_i$ is 0; for the symbol period 812-5, $\sigma_5$ is 4.

In addition, for the $i^{th}$ symbol period 812-$i$, a number $k_{max}$ is determined in this way:

$k_{max}$ is the largest integer such that:

$k_{max} \times s_i < T_i.$

For example, assume that $T_i$ is 360, $s_1$ to $s_9$ is 45 in one example supra, then $k_{max}$ is 7 (for symbol periods 812-1 to 812-9).

Then assigned resource elements 820-$i$-$j$ can be indexed by the following:

$j = k \times s_i + \sigma_i$, k is 0, 1, 2, . . . , $k_{max}$.

If the resource element 820-$i$-$j$ is already occupied, then skip that resource element 820-$i$-$j$ and assign the next resource element 820-$i$-($j+s_i$). For instance, for the symbol period 812-1 (i.e., i=1), $\sigma_1$ is 0. Assume that $T_1$ is 360, and $s_i$ is 45, then $k_{max}$ is 7. Then assigned resource elements 820-1-$j$ can be indexed by the following:

$j = k \times s_i + \sigma_i = k \times s_1 + \sigma_1 = 45 k$, k is 0, 1, 2, . . . , 7.

In other words, the assigned resource elements 820-1-$j$ are eight resource elements 820-1-0, 820-1-45, 820-1-90, 820-1-135, 820-1-180, 820-1-225, 820-1-270, 820-1-315.

It should be noted that the offset value $\sigma_i$ may be other value for the $i^{th}$ symbol period 812-$i$.

After this step, if the number of already assigned resource elements 820-$i$-$j$ is smaller than $U_i$, i.e., there are some resource elements 820-$i$-$j$ which are still not assigned. Therefore, the second step of the two-step approach need to be applied. A new smallest integer $\sigma_1$ is determined such that the resource elements 820-$i$-$j$ indexed by the following is unoccupied:

$j = k \times s_i + \sigma_i$, k is 0, 1, 2, 3, . . .

In other words, a new offset value $\sigma_i$ is used while the step s remains unchanged. With this new offset value $\sigma_i$, the first step of the two-step approach is applied again. This process continues until all $U_i$ resource elements have been assigned. Then the same technique is applied for the next symbol period, i.e., the symbol period 812-($i$+1).

In a third technique, if m is not larger than the number of available resource elements in the first symbol period to be assigned (e.g., the symbol period 812-1), then N is set to be 1. In other words, all the m modulated symbols are mapped to one symbol period (i.e., the symbol periods 812-1). Then the same process as mentioned supra is applied again.

However, if m is larger than the number of available resource elements in the first symbol period to be assigned (e.g., the symbol period 812-1), then modulated symbols are first mapped successively across subcarriers (e.g., the subcarriers 814-0 to 814-359) that are not yet occupied, and then across symbols (e.g., the symbol periods 812-1 to 812-N).

FIG. 8 also illustrates a mapping pattern after applying the technique supra for CSI Part 1 824-$i$-$j$. Assume that CSI Part 1 needs 184 resource elements 820-$i$-$j$ to carry modulated symbols, are the 184 resource elements needed are mapped to one symbol period which is the symbol period 812-1. In other words, N is 1 and m is 184. Since N is 1, there is one symbol period 812-1 to assign the 184 resource elements 820-$i$-$j$, and there is only one $U_i$ which is $U_1$($U_1$ is 184). Moreover, the symbol period 812-1 is not previously occupied, and $n_{RB}$ is 30. Therefore, the number $T_1$ of resource elements available in the first symbol period 812-1 is 360. So far, the mapping problem becomes how to assign 184 resource elements 820-1-$j$ out of the 360 available resource elements 820-1-0 to 820-1-359.

Now apply the two-step approach. In the first step, a step $s_1$ (here, i=1) is calculated as follows:

$$s_1 = \left\lceil \frac{T_1}{U_1} \right\rceil = \left\lceil \frac{360}{184} \right\rceil = 2.$$

In other words, resource elements 820-1-*j* are assigned with a step of 2 (i.e., two resource elements next to each other has a distance which is at least one subcarrier 814-*j*). Applying the equations supra, σ₁=*i*−1=0, because i is 1 here.

Since $s_1$ is 2 and $T_1$ is 360, $k_{max}$ is 179 because $k_{max}$ is the largest integer such that $k_{max} \times s_i < M_i$, here i is 1.

Because none of the 360 resource elements in the symbol period 812-1 has previously been occupied, assigned resource elements are indexed by the following:

$k \times s_i + \sigma_i = 2k + 0 = 2k$, k is 0, 1, 2, ..., 179.

In other words, in this example, resource elements 820-1-*j* are assigned, and j is 2k while k is 0, 1, 2, ..., 179. In other words, resource elements assigned are resource elements 820-1-0, 820-1-2, 820-1-4, ..., 820-1-358.

After this step, the number of already assigned resource elements is 180 which is smaller than $U_1$ which is 184. In other words, there are 4 resource elements 820-1-*j* which are still not assigned. Therefore, the second step of the two-step approach need to be applied. A new smallest integer $\sigma_1$ is determined such that the resource element indexed by the following is unoccupied:

$k \times s_i + \sigma_i = 2k + \sigma_1$, k is 0, 1, 2, 3 because there are 4 resource elements to be assigned.

In this case, since resource element 820-1-1 is unoccupied, therefore, the new $\sigma_1$ is 1. In other words, this time, resource elements 820-1-*j* are assigned, and j is (2k+1) while k is 0, 1, 2, 3. In other words, this time, these four resource elements are assigned: resource elements 820-1-1, 820-1-3, 820-1-5, 820-1-7.

In summary, by applying the two steps of the two-step approach, all the 184 resource elements needed are assigned in the symbol period 812-0, and the end result is shown in FIG. 8. It should be noted that this is an example where N is 1, and for any other number of N (e.g., 10), the technique is similar and the difference is that the technique described supra is applied to each of the N symbol periods (e.g., symbol periods 812-1 to 812-N).

It should be noted that after the m modulated symbols to carry UCI for a portion of CSI reporting (e.g., CSI Part 1) have been assigned by means of the techniques supra, another m' resource elements needed to carry UCI for another portion of CSI reporting (e.g., CSI Part 2) have been assigned by means of the techniques supra. In other words, the techniques supra can be applied to different components of uplink information (like UCI) one by one. Under some circumstances, uplink information includes acknowledges, CSI Part 1, and CSI Part 2, and the order of these uplink information depends on the priorities thereof. Under some circumstances, different priorities can be set as needed.

Moreover, it should be noted that since $U_i$ resource elements out of the $T_i$ available resource elements in the $i^{th}$ symbol period 812-*i* are assigned to carry modulated symbols, it is likely that $U_i$ is relatively small compared to $T_i$, especially for the case where a UE 704 is allocated with a large bandwidth. In such a case, distributing UCI to sparse resource elements 820-*i*-*j* along frequency domain (e.g., subcarriers 814-0 to 814-359) exhibits good diversity gain.

In another aspect of the invention, the first, second, and third techniques can be applied to the cases with frequency hopping.

Figure 9:
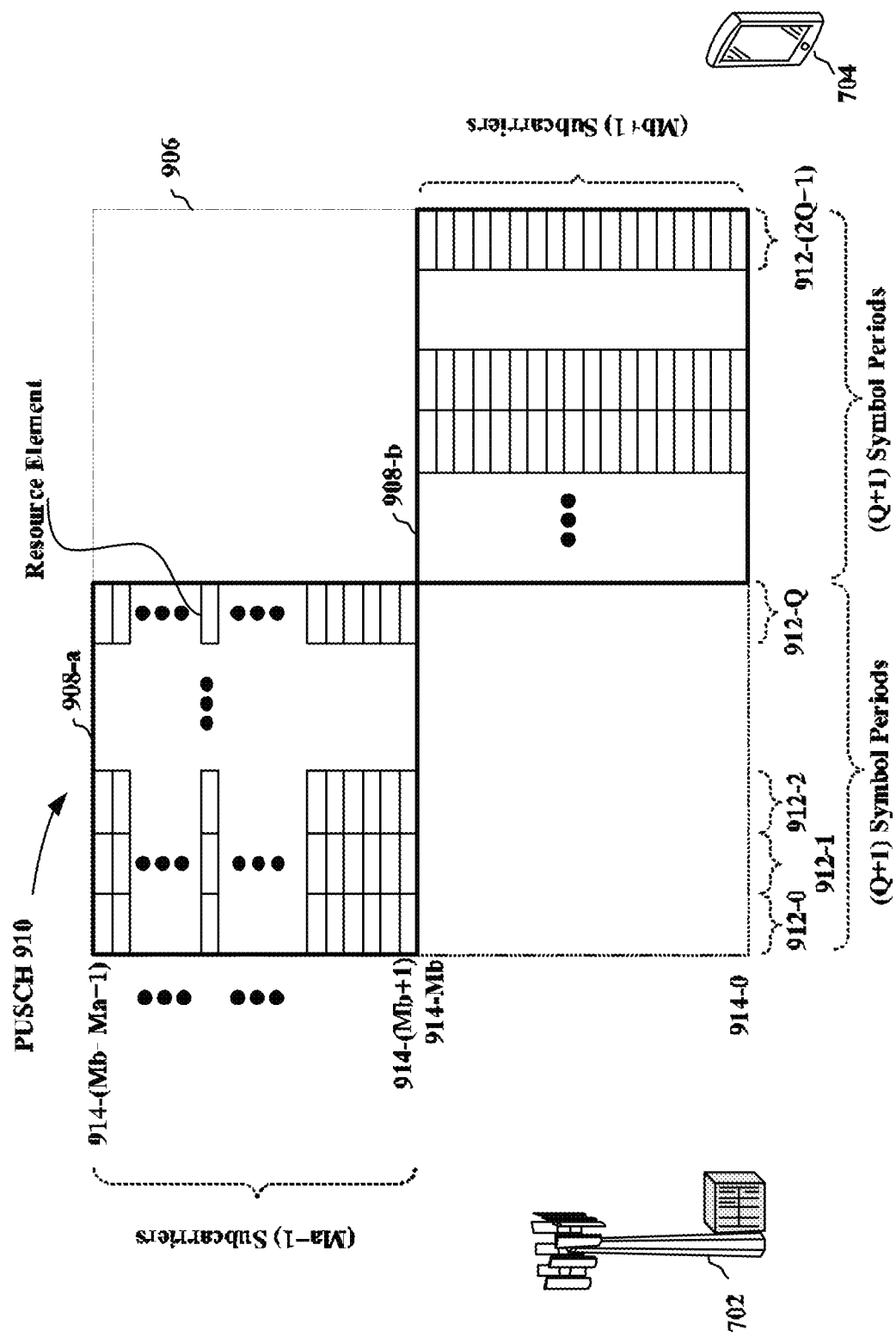
FIG. 9 is another diagram illustrating procedures for transmitting uplink information from a UE to a base station.

FIG. 9 is another diagram 900 illustrating procedures for transmitting uplink information from the UE 704 to the base station 702. The UE 704, employing a frequency hopping technique, is allocated a PUSCH 910 containing a region 908-*a* and a region 908-b in an uplink slot 906. In this example, the region 908-*a* contains the first half of the uplink slot 906 in time domain and the region 908-*b* contains the second half of the uplink slot 906 in time domain. More specifically, the region 908-*a* contains (Q+1) symbol periods 912-0 to 912-Q and (Ma+1) subcarriers 914-(Mb+1) to 914-(Mb+Ma+1). The region 908-b contains (Q+1) symbol periods 912-(Q+1) to 912-(2Q+1) and (Mb+1) subcarriers 914-0 to 914-Mb. Ma may equal to Mb.

The UE 704 may be configured to map the m modulated symbols to the PUSCH 910. The region 908-*a* may have R1 resource elements available for carrying the m modulated symbols. The region 908-*b* may have R2 resource elements available for carrying the m modulated symbols.

In certain configurations, the UE 704 first maps the m modulated symbols into the region 908-*a* by using the techniques described supra. After occupying the available resource elements in the region 908-*a*, the UE 704 determines whether there are modulated symbols left to be mapped to the PUSCH 910. When there are modulated symbols left, the UE 704 maps the remaining modulated symbols to the region 908-*b* by using the techniques described supra.

In certain configurations, the UE 704 may divide the m modulated symbols into two groups: a first group with $m_1$ modulated symbols and a second group with $m_2$ modulated symbols. In other words, m is the sum of $m_1$ and $m_2$. One example of this division is as follows:

$$m_1 = \left\lceil \frac{m}{2} \right\rceil, \text{ and}$$

$$m_2 = m - \left\lceil \frac{m}{2} \right\rceil.$$

For example, if m is 101, then $m_1$ is 51 and $m_2$ is 50. Alternatively, another division is as follows:

$$m_1 = m - \left\lceil \frac{m}{2} \right\rceil, \text{ and}$$

$$m_2 = \left\lceil \frac{m}{2} \right\rceil.$$

For example, if m is 101, then $m_1$ is 50 and $m_2$ is 51.

The UE 704 then maps the $m_1$ symbols into the region 908-*a* by using the techniques described supra. The UE 704 also maps the $m_2$ symbols into the region 908-*b* by using the techniques described supra. Further, if $m_1$ is greater than R1, the $m_1$ may be set to R1, and $m_2$ may be set to (m−R1).

Figure 10:
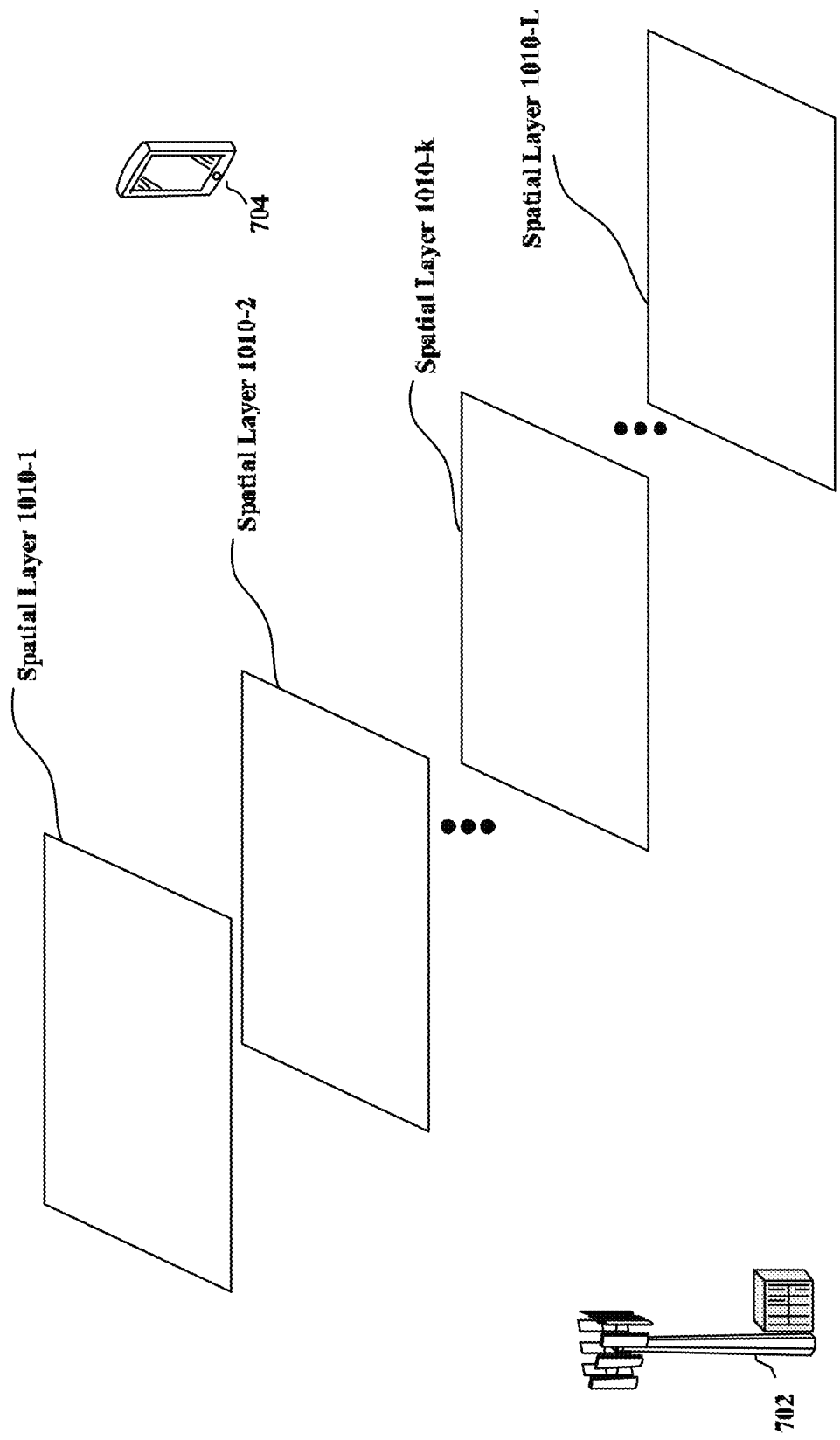
FIG. 10 is yet another diagram illustrating procedures for transmitting uplink information from a UE to a base station.

FIG. 10 is another diagram 1000 illustrating procedures for transmitting uplink information from the UE 704 to the base station 702. In this example, the UE 704 and the base station 702 communicate on spatial layers 1010-1 to 1010-L. On each of the spatial layers 1010-1 to 1010-L, the UE 704 is allocated a PUSCH 710. As described supra, the UE 704 may generate m modulated symbols for a particular category of uplink information.

In certain configurations, the UE 704 may map the m modulated symbols to the spatial layers 1010-1 to 1010-L in a predetermined order. For example, the UE 704 may first map a maximum number of modulated symbols from the m modulated symbols to the PUSCH 710 of the spatial layer 1010-1 by using the techniques described supra. If there are modulated symbols in the m modulated symbols left unmapped, the UE 704 may a maximum number of modulated symbols from the remaining modulated symbols to the PUSCH 710 of the spatial layer 1010-2 by using the techniques described supra. The UE 704 may repeat these procedures until all m modulated symbols have been mapped.

In certain configurations, the UE 704 may divide the m modulated symbols into L groups. Then the UE 704 maps the L groups of modulated symbols to the spatial layers 1010-1 to 1010-L, respectively, by using the techniques described supra.

One remaining issue is how to determine the number N of symbol periods to carry UCI for CSI Part1 or CSI Part 2. In some circumstances, network or the base station 702 can signal this value to the UE 704. In some circumstances, the UE 704 and the base station 702 derive this value based on the amount of resource elements needed.

Figure 11:
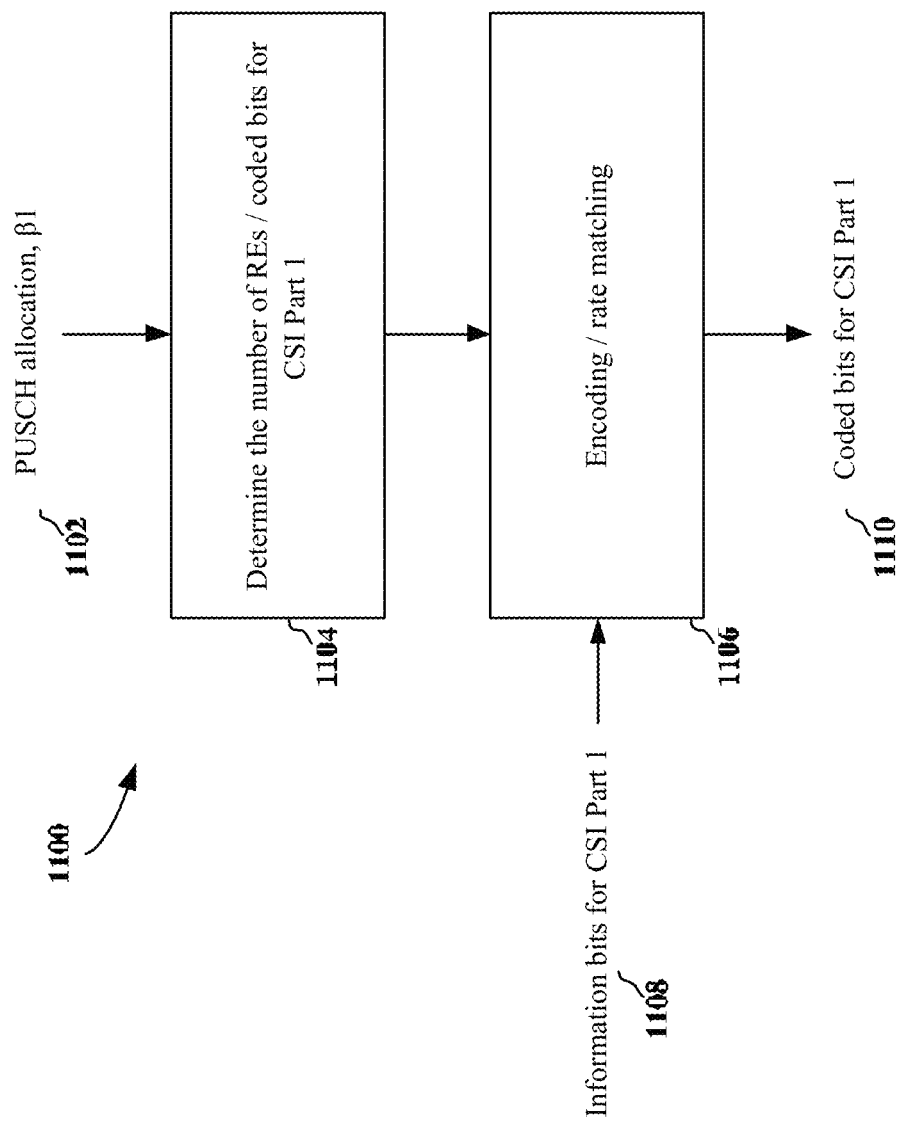
FIG. 11 is a diagram illustrating the process of determining the number of symbol periods to carry UCI for CSI Part 1.

FIG. 11 is a diagram illustrating the process 1100 of determining the number of symbol periods to carry UCI for CSI Part 1. Based on PUSCH allocation (e.g., $\beta_1$) 1102, the UE 704, at operation 1104, determines the number of resource elements or coded bits needed to carry CSI Part 1. Since the UE 704 knows the code-rate, at operation 1106, the UE 704 generates coded bits for CSI Part 1 1110 based on the number of resource elements or coded bits needed to carry CSI Part 1 and information bits for CSI Part 1 1108. Network or the base station 702 knows the number of resource elements needed for carrying CSI Part 1 because CSI Part 1 is of a fixed payload size, and knows the number of resource elements needed for CSI Part 2 after decoding CSI Part 1. Then N can be determined in this way: N is the maximum number such that the sum of available resource elements from the first symbol period (e.g., the symbol period 812-1) to the $(N-1)^{th}$ symbol period (e.g., the symbol period 812-1) is still smaller than m.

Figure 12:
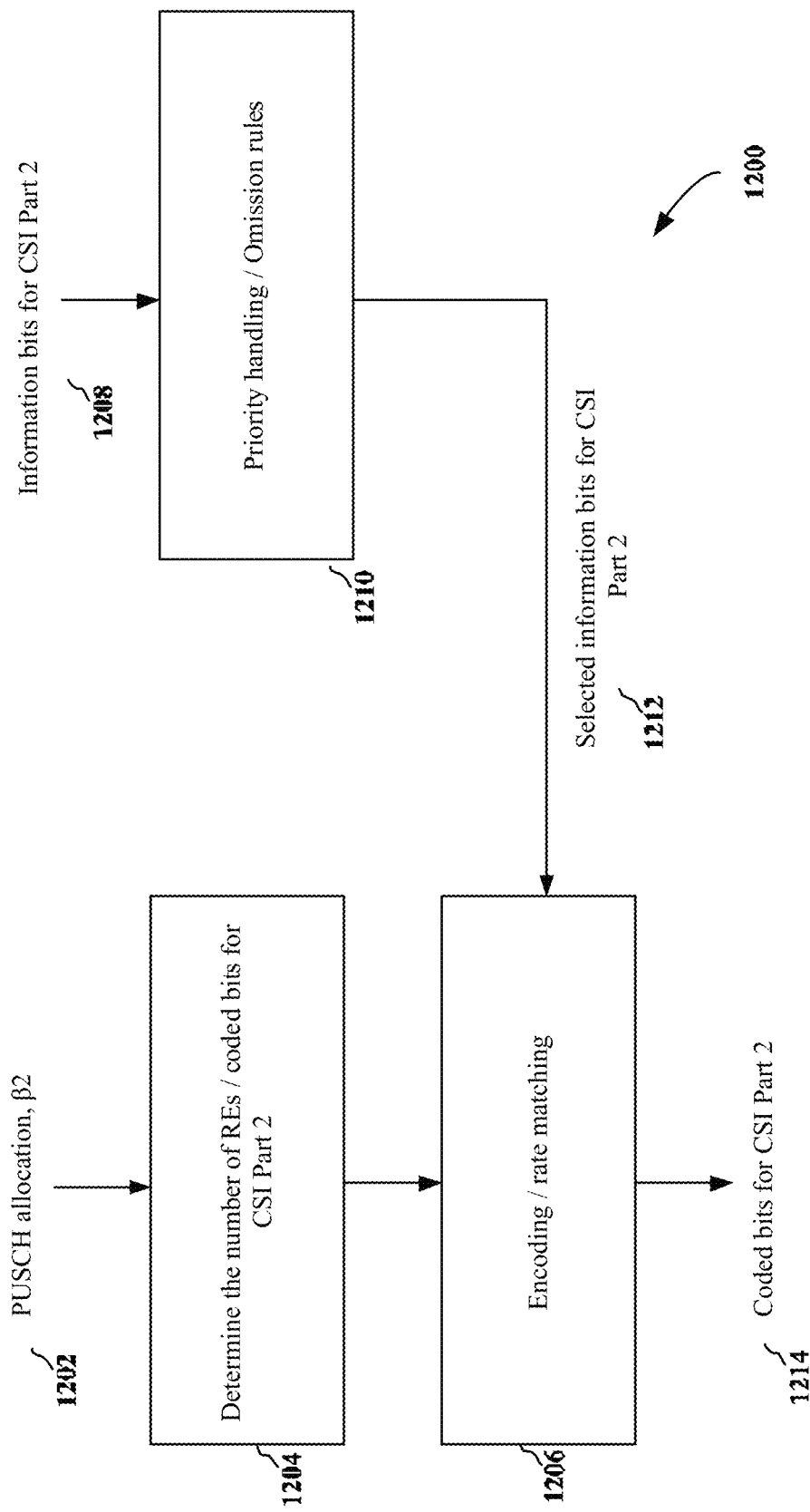
FIG. 12 is a diagram illustrating the process of determining the number of symbol periods to carry UCI for CSI Part 2.

FIG. 12 is a diagram illustrating the process 1200 of determining the number of symbol periods to carry UCI for CSI Part 2. Based on PUSCH allocation (e.g., $\beta_2$) 1202, the UE 704, at operation 1204, determines the number of resource elements or coded bits needed to carry CSI Part 2. Since the UE 704 knows the code-rate, at operation 1206, the UE 704 generates coded bits for CSI Part 2 1214 based on the number of resource elements or coded bits needed to carry CSI Part 1 and selected information bits for CSI Part 2 1212. Different from CSI Part 1 in FIG. 11, the selected information bits for CSI Part 2 1212 is obtained, at operation 1210, by applying priority handling or omission rules to information bits for CSI Part 2 1208.

Figure 13:
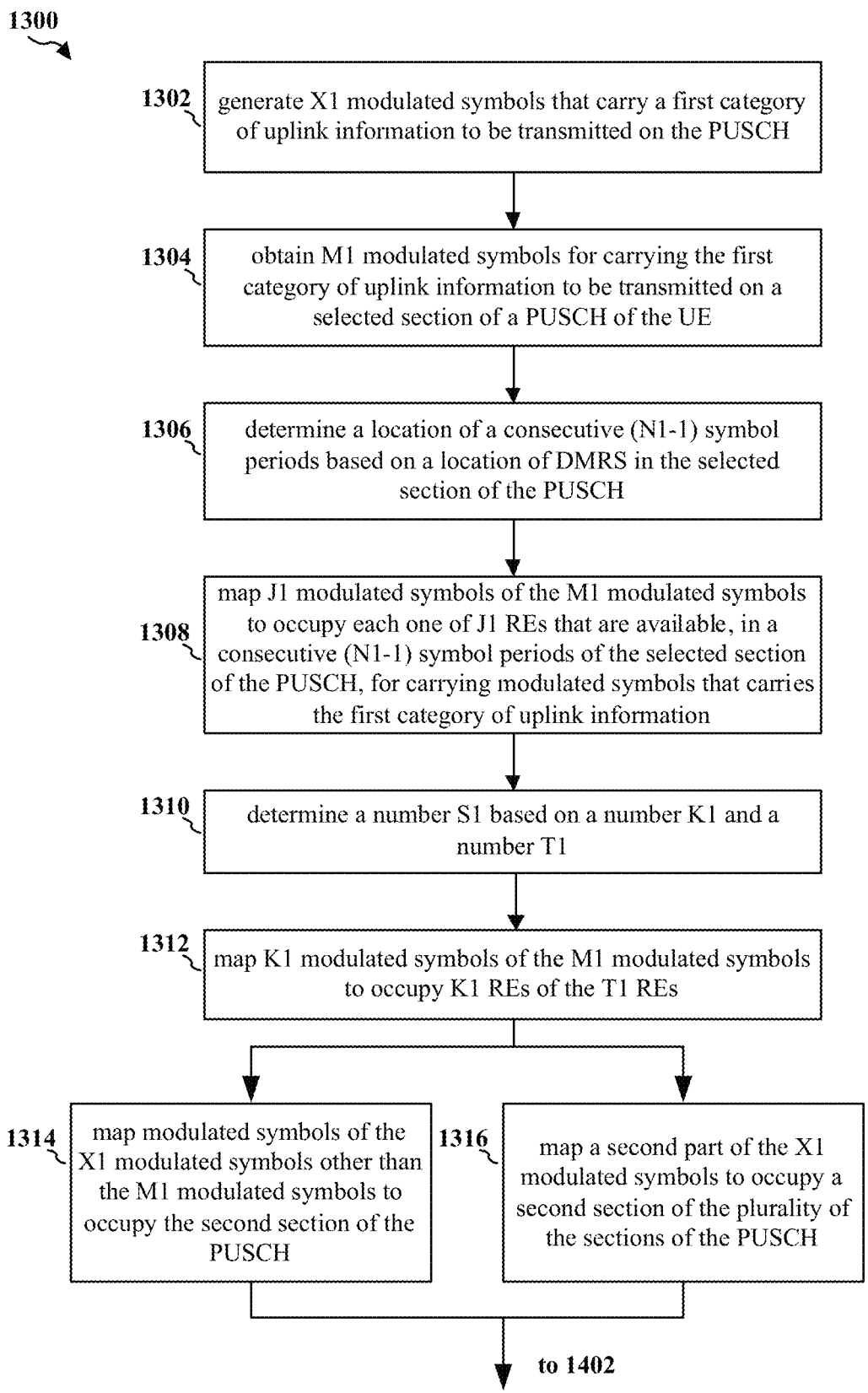
FIG. 13 is a flow chart illustrating a method (process) of resource allocation for control information in physical channel.

FIG. 13 is a flow chart 1300 illustrating a method (process) of resource allocation for uplink information in physical channel. The method may be performed by a UE (e.g., the UE 704, the apparatus 1502/1502'). At operation 1302, the UE 704 generates X1 modulated symbols that carry a first category of uplink information (e.g., ACK/NACK or CSI Part 1) to be transmitted on the PUSCH (e.g., the PUSCH 910 and 710).

At operation 1304, the UE 704 obtains M1 modulated symbols (e.g., m modulated symbols) for carrying the first category of uplink information (e.g., ACK/NACK or CSI Part 1) to be transmitted on a selected section (e.g., the region 908-a) of a PUSCH of the UE (e.g., the UE 704). In certain configurations, the selected section of the PUSCH includes the entire PUSCH (e.g., the PUSCH 710) of the UE.

In certain configurations (frequency hopping), the PUSCH (the PUSCH 910) includes a first section (the region 908-a) of the PUSCH that spans a first part (e.g., the subcarriers 914-(Mb+1) to 914-(Mb+Ma+1)) of a frequency range (e.g., the subcarriers 914-0 to 914-(Mb+Ma+1)) of the PUSCH and a second section (e.g., the region 908-b) of the PUSCH that spans a second part (e.g., the subcarriers 914-0 to 914-Mb) of the frequency range of the PUSCH. The selected section (e.g., the region 908-a or the region 908-b) of the PUSCH is one of the first section of the PUSCH and the second section of the PUSCH. The first part of the frequency range does not overlap with the second part of the frequency range. In certain configurations, the selected section of the PUSCH is the first section (e.g., the region 908-a) of the PUSCH, and the M1 modulated symbols are obtained from the X1 modulated symbols. In certain configurations, M1 is the minimum integer that is smaller than or equal to (X1/2). In certain configurations, M1 is the maximum integer that is greater than or equal to (X1/2).

In certain configurations (spatial layers), the UE 704 communicates on a plurality of spatial layers (e.g., the spatial layers 1010-1 to 1010-L). The PUSCH includes a plurality of sections on the plurality of spatial layers, respectively, and the selected section of the PUSCH is one of the plurality of sections of the PUSCH. In certain configurations, the selected section of the PUSCH is a first section of the plurality of the sections of the PUSCH (e.g., the PUSCH 710 on the spatial layer 1010-1), and the M1 modulated symbols are a first part of the X1 modulated symbols.

At operation 1306, the UE 704 determine a location of the consecutive (N1−1) symbol periods (e.g., the symbol periods 812-1 to 812-(N−1)) based on a location (e.g., the symbol period 812-0) of DMRS (e.g., the DMRS 824) in the selected section of the PUSCH (e.g., the PUSCH 810). In certain configurations, the location of the consecutive (N1−1) symbol periods is determined to start after a first burst of consecutive symbol periods occupied by DMRSs (e.g., the symbol periods 812-0) in the selected section of the PUSCH.

At operation 1308, the UE 704 maps J1 modulated symbols of the M1 modulated symbols to occupy each one of J1 resource elements that are available (e.g., the available resource elements 820-i-j), in the consecutive (N1−1) symbol periods (e.g., the symbol periods 812-1 to 812-(N−1)) of the selected section of the PUSCH, for carrying modulated symbols that carries the first category of uplink information. (N1−1) is a maximum integer that allows J1 to be smaller than M1, K1 (e.g., 184) is a difference between J1 and M1.

At operation 1310, the UE 704 determines a number S1 based on a number K1 (e.g., 184 in the example of FIG. 8) and a number T1 (e.g., 360 in the example of FIG. 8). T1 (e.g., 360) REs is available in a N1th symbol period (e.g., the symbol period 812-N) of the selected section of the PUSCH for carrying modulated symbols that carries the first category of uplink information, and the N1th symbol period are subsequent and consecutive to the consecutive (N1−1) symbol periods. In certain configurations, S1 (e.g., 2) is an integer equal to or adjacent to (T1/K1).

At operation 1312, the UE 704 maps K1 (e.g., 184) modulated symbols of the M1 modulated symbols to occupy K1 REs of the T1 (e.g., 360) REs. Two adjacent REs (e.g., the resource element 812-N-0 and the resource element 812-N-2) among the K1 REs are separated by at least (S1−1) REs (e.g., one RE).

At operation 1314 in certain configurations (frequency hopping), the UE 704 maps modulated symbols of the X1 modulated symbols other than the M1 modulated symbols to occupy the second section (e.g., the region 908-*b*) of the PUSCH (e.g., the PUSCH 910).

Alternatively, at operation 1316 in certain configurations (spatial layers), the UE 704 maps a second part of the X1 modulated symbols to occupy a second section of the plurality of the sections of the PUSCH.

Figure 14:
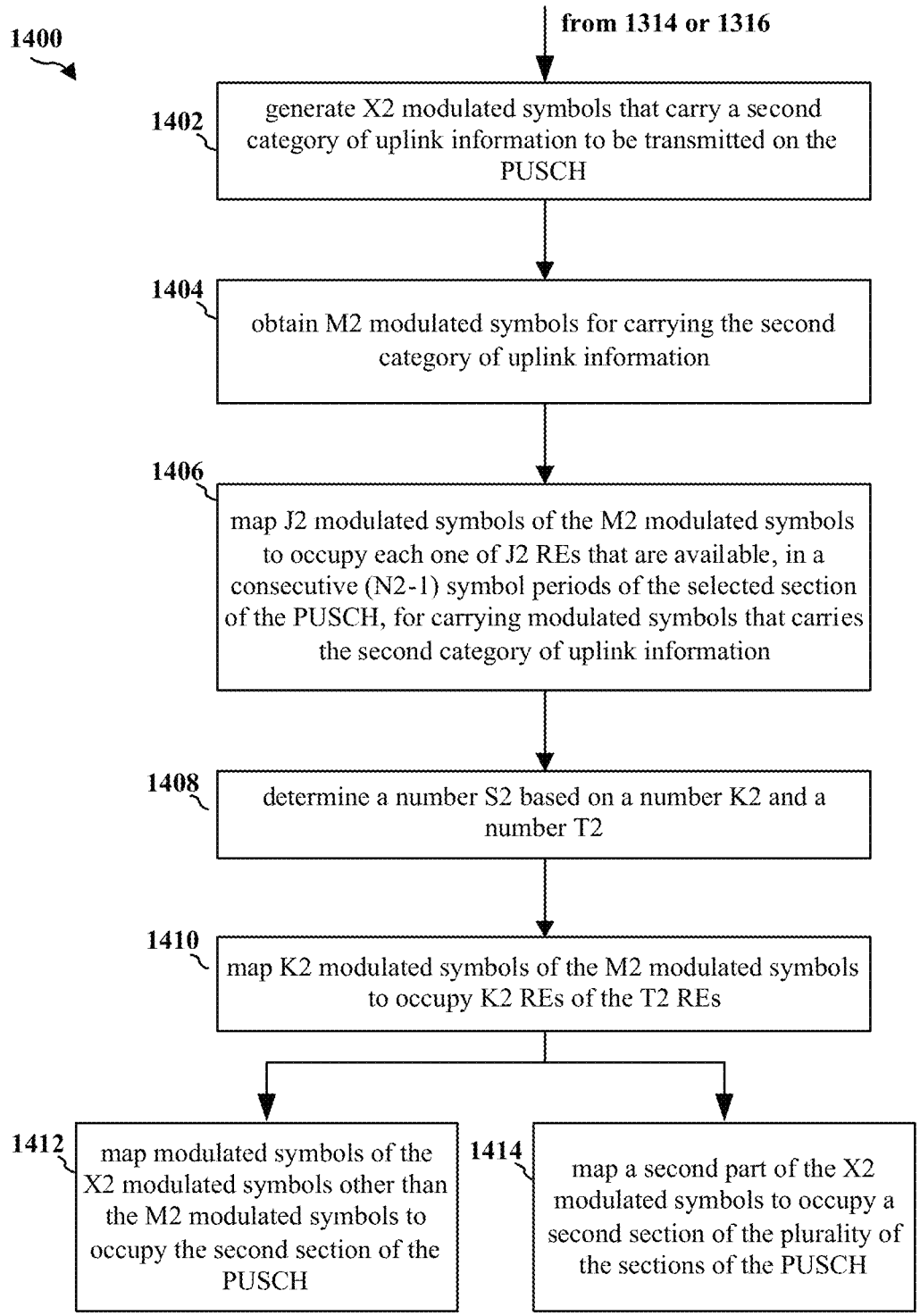
FIG. 14 is a another flow chart illustrating a method (process) of resource allocation for control information in physical channel.

Operation 1314 or 1316 is followed by operation 1402 in FIG. 14.

FIG. 14 is a flow chart 1400 illustrating a method (process) of resource allocation for control information in physical channel. The method may be performed by a UE (e.g., the UE 704, the apparatus 1502/1502'). At operation 1402, the UE 704 generates X2 modulated symbols that carry a second category of uplink information (e.g., CSI Part 2) to be transmitted on the PUSCH (e.g., the PUSCH 910 and 710). In certain configurations, the first category of uplink information (e.g., ACK/NACK or CSI Part 1) has a priority higher than a priority of the second category of uplink information (e.g., CSI Part 2) for being mapped to the REs of the PUSCH. In certain configurations, the first category of uplink information and the second category of uplink information are two of: an uplink acknowledgment or negative acknowledgment (e.g., ACK/NACK); a first part of a CSI report (e.g., CSI Part 1); a second part of a CSI report (e.g., CSI Part 2).

At operation 1404, the UE 704 obtains M2 modulated symbols for carrying the second category of uplink information (e.g., CSI Part 2) to be transmitted on a selected section (e.g., the region 908-*b*) of a PUSCH of the UE (e.g., the UE 704).

In certain configurations (frequency hopping supra), the selected section of the PUSCH is the first section (e.g., the region 908-*a*) of the PUSCH, and the M2 modulated symbols are obtained from the X2 modulated symbols. In certain configurations, M2 is the minimum integer that is smaller than or equal to (X2/2). In certain configurations, M2 is the maximum integer that is greater than or equal to (X2/2).

In certain configurations (spatial layers supra), the selected section of the PUSCH is a first section of the plurality of the sections of the PUSCH, and the M2 modulated symbols are a first part of the X2 modulated symbols.

At operation 1406, the UE 704 maps J2 modulated symbols of the M2 modulated symbols to occupy each one of J2 resource elements that are available (e.g., the available resource elements 820-*i-j*), in the consecutive (N2−1) symbol periods (e.g., the symbol periods 812-1 to 812-(N2−1)) of the selected section of the PUSCH, for carrying modulated symbols that carries the second category of uplink information (e.g., CSI Part 2). (N2−1) is a maximum integer that allows J2 to be smaller than M2. An initial symbol period of the consecutive (N2−1) symbol periods is the N1th symbol period (e.g., the symbol period 812-N). K2 (e.g., 184) is a difference between J2 and M2.

At operation 1408, the UE 704 determines a number S2 based on a number K2 (e.g., 184) and a number T2 (e.g., 360). T1 (e.g., 360) REs is available in the N2th symbol period (e.g., the symbol period 812-N2) of the selected section of the PUSCH for carrying modulated symbols that carries the second category of uplink information. The N2th symbol period is subsequent and consecutive to the consecutive (N2−1) symbol periods. In certain configurations, S2 (e.g., 2) is an integer equal to or adjacent to (T2/K2).

At operation 1410, the UE 704 maps K2 (e.g., 184) modulated symbols of the M2 modulated symbols to occupy K2 REs of the T2 (e.g., 360) REs. Two adjacent REs (e.g., the resource element 812-N2-0 and the resource element 812-N2-2) among the K2 REs are separated by at least (S2−1) REs (e.g., one RE).

At operation 1412 in certain configurations (frequency hopping), the UE 704 maps modulated symbols of the X2 modulated symbols other than the M2 modulated symbols to occupy the second section (e.g., the region 908-*b*) of the PUSCH (e.g., the PUSCH 910).

Alternatively, at operation 1414 in certain configurations (spatial layers), the UE 704 maps a second part of the X2 modulated symbols to occupy a second section of the plurality of the sections of the PUSCH.

Figure 15:
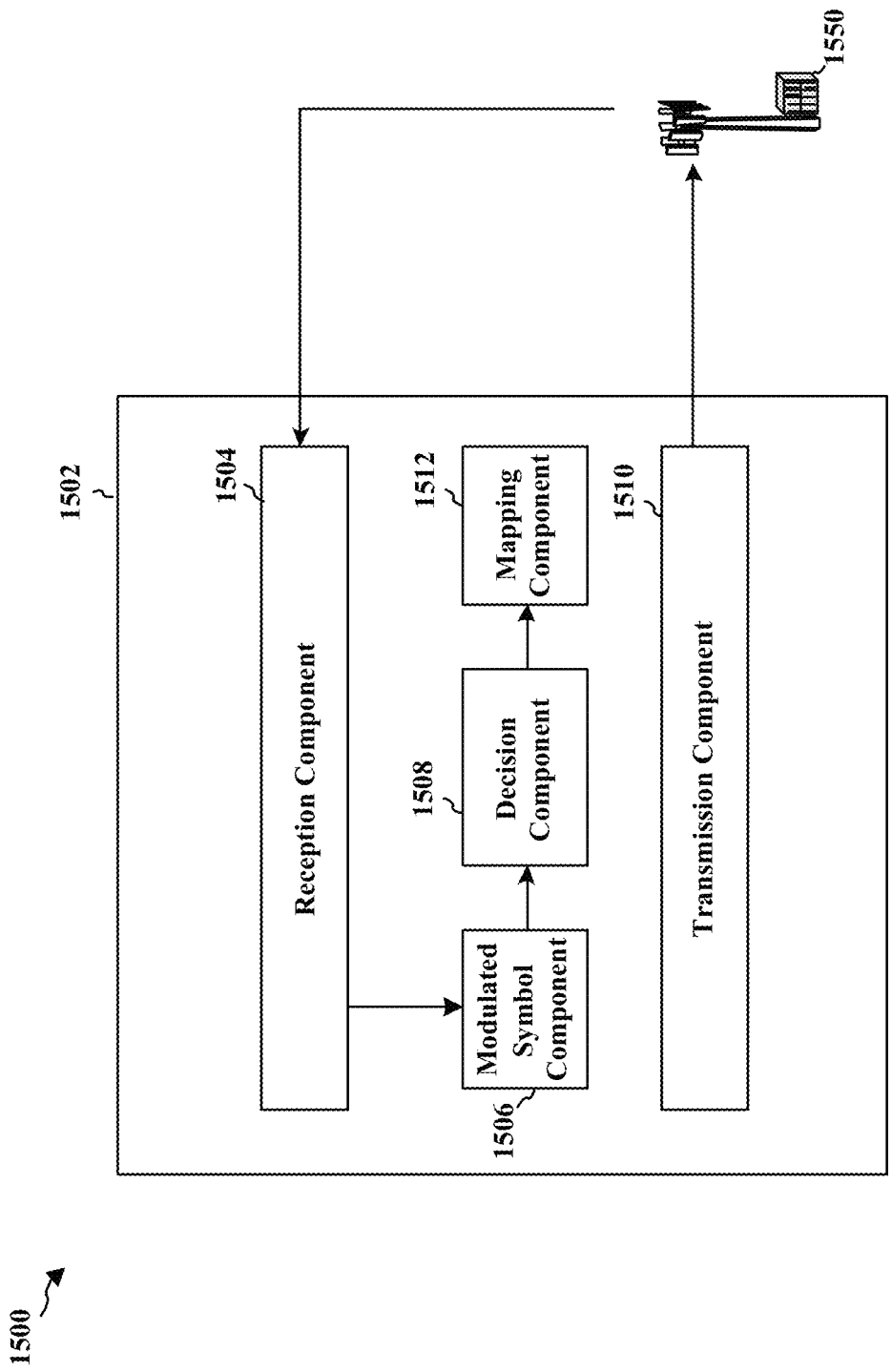
FIG. 15 is a conceptual data flow diagram illustrating the data flow between different components/means in an exemplary apparatus.

FIG. 15 is a conceptual data flow diagram 1500 illustrating the data flow between different components/means in an exemplary apparatus 1502. The apparatus 1502 may be a UE. The apparatus 1502 includes a reception component 1504, a modulated symbol component 1506, a decision component 1508, a mapping component 1512, and a transmission component 1510.

The modulated symbol component 1506 generates X1 modulated symbols that carry a first category of uplink information (e.g., ACK/NACK or CSI Part 1) to be transmitted on the PUSCH (e.g., the PUSCH 910 and 710).

The modulated symbol component 1506 obtains M1 modulated symbols (e.g., m modulated symbols) for carrying the first category of uplink information (e.g., ACK/NACK or CSI Part 1) to be transmitted on a selected section (e.g., the region 908-*a*) of a PUSCH of the UE (e.g., the UE 704). In certain configurations, the selected section of the PUSCH includes the entire PUSCH (e.g., the PUSCH 710) of the UE.

In certain configurations (frequency hopping), the PUSCH (the PUSCH 910) includes a first section (the region 908-*a*) of the PUSCH that spans a first part (e.g., the subcarriers 914-(Mb+1) to 914-(Mb+Ma+1)) of a frequency range (e.g., the subcarriers 914-0 to 914-(Mb+Ma+1)) of the PUSCH and a second section (e.g., the region 908-*b*) of the PUSCH that spans a second part (e.g., the subcarriers 914-0 to 914-Mb) of the frequency range of the PUSCH. The selected section (e.g., the region 908-*a* or the region 908-*b*) of the PUSCH is one of the first section of the PUSCH and the second section of the PUSCH. The first part of the frequency range does not overlap with the second part of the frequency range. In certain configurations, the selected section of the PUSCH is the first section (e.g., the region 908-*a*) of the PUSCH, and the M1 modulated symbols are obtained from the X1 modulated symbols. In certain configurations, M1 is the minimum integer that is smaller than or equal to (X1/2). In certain configurations, M1 is the maximum integer that is greater than or equal to (X1/2).

In certain configurations (spatial layers), the reception component 1504 and the transmission component 1510 communicates on a plurality of spatial layers (e.g., the spatial layers 1010-1 to 1010-L). The PUSCH includes a plurality of sections on the plurality of spatial layers, respectively, and the selected section of the PUSCH is one of the plurality of sections of the PUSCH. In certain configurations, the selected section of the PUSCH is a first section of the plurality of the sections of the PUSCH (e.g., the PUSCH 710 on the spatial layer 1010-1), and the M1 modulated symbols are a first part of the X1 modulated symbols.

The decision component 1508 determines a location of the consecutive (N1−1) symbol periods (e.g., the symbol periods 812-1 to 812-(N−1)) based on a location (e.g., the symbol period 812-0) of DMRS (e.g., the DMRS 824) in the selected section of the PUSCH (e.g., the PUSCH 810). In certain configurations, the location of the consecutive (N1−

1) symbol periods is determined to start after a first burst of consecutive symbol periods occupied by DMRSs (e.g., the symbol periods 812-0) in the selected section of the PUSCH.

The mapping component 1512 maps J1 modulated symbols of the M1 modulated symbols to occupy each one of J1 resource elements that are available (e.g., the available resource elements 820-$i$-$j$), in the consecutive (N1−1) symbol periods (e.g., the symbol periods 812-1 to 812-(N−1)) of the selected section of the PUSCH, for carrying modulated symbols that carries the first category of uplink information. (N1−1) is a maximum integer that allows J1 to be smaller than M1, K1 (e.g., 184) is a difference between J1 and M1.

The decision component 1508 determines a number S1 based on a number K1 (e.g., 184 in the example of FIG. 8) and a number T1 (e.g., 360 in the example of FIG. 8). T1 (e.g., 360) REs is available in a N1th symbol period (e.g., the symbol period 812-N) of the selected section of the PUSCH for carrying modulated symbols that carries the first category of uplink information, and the N1th symbol period are subsequent and consecutive to the consecutive (N1−1) symbol periods. In certain configurations, S1 (e.g., 2) is an integer equal to or adjacent to (T1/K1).

The mapping component 1512 maps K1 (e.g., 184) modulated symbols of the M1 modulated symbols to occupy K1 REs of the T1 (e.g., 360) REs. Two adjacent REs (e.g., the resource element 812-N-0 and the resource element 812-N-2) among the K1 REs are separated by at least (S1−1) REs (e.g., one RE).

In certain configurations (frequency hopping), the mapping component 1512 maps modulated symbols of the X1 modulated symbols other than the M1 modulated symbols to occupy the second section (e.g., the region 908-$b$) of the PUSCH (e.g., the PUSCH 910).

Alternatively, in certain configurations (spatial layers), the mapping component 1512 maps a second part of the X1 modulated symbols to occupy a second section of the plurality of the sections of the PUSCH.

The modulated symbol component 1506 generates X2 modulated symbols that carry a second category of uplink information (e.g., CSI Part 2) to be transmitted on the PUSCH (e.g., the PUSCH 910 and 710). In certain configurations, the first category of uplink information (e.g., ACK/NACK or CSI Part 1) has a priority higher than a priority of the second category of uplink information (e.g., CSI Part 2) for being mapped to the REs of the PUSCH. In certain configurations, the first category of uplink information and the second category of uplink information are two of: an uplink acknowledgment or negative acknowledgment (e.g., ACK/NACK); a first part of a CSI report (e.g., CSI Part 1); a second part of a CSI report (e.g., CSI Part 2).

The modulated symbol component 1506 obtains M2 modulated symbols for carrying the second category of uplink information (e.g., CSI Part 2) to be transmitted on a selected section (e.g., the region 908-$b$) of a PUSCH of the UE (e.g., the UE 704).

In certain configurations (frequency hopping supra), the selected section of the PUSCH is the first section (e.g., the region 908-$a$) of the PUSCH, and the M2 modulated symbols are obtained from the X2 modulated symbols. In certain configurations, M2 is the minimum integer that is smaller than or equal to (X2/2). In certain configurations, M2 is the maximum integer that is greater than or equal to (X2/2).

In certain configurations (spatial layers supra), the selected section of the PUSCH is a first section of the plurality of the sections of the PUSCH, and the M2 modulated symbols are a first part of the X2 modulated symbols.

The mapping component 1512 maps J2 modulated symbols of the M2 modulated symbols to occupy each one of J2 resource elements that are available (e.g., the available resource elements 820-$i$-$j$), in the consecutive (N2−1) symbol periods (e.g., the symbol periods 812-1 to 812-(N2−1)) of the selected section of the PUSCH, for carrying modulated symbols that carries the second category of uplink information (e.g., CSI Part 2). (N2−1) is a maximum integer that allows J2 to be smaller than M2. An initial symbol period of the consecutive (N2−1) symbol periods is the N1th symbol period (e.g., the symbol period 812-N). K2 (e.g., 184) is a difference between J2 and M2.

The decision component 1508 determines a number S2 based on a number K2 (e.g., 184) and a number T2 (e.g., 360). T1 (e.g., 360) REs is available in the N2th symbol period (e.g., the symbol period 812-N2) of the selected section of the PUSCH for carrying modulated symbols that carries the second category of uplink information. The N2th symbol period is subsequent and consecutive to the consecutive (N2−1) symbol periods. In certain configurations, S2 (e.g., 2) is an integer equal to or adjacent to (T2/K2).

The mapping component 1512 maps K2 (e.g., 184) modulated symbols of the M2 modulated symbols to occupy K2 REs of the T2 (e.g., 360) REs. Two adjacent REs (e.g., the resource element 812-N2-0 and the resource element 812-N2-2) among the K2 REs are separated by at least (S2−1) REs (e.g., one RE).

In certain configurations (frequency hopping), the mapping component 1512 maps modulated symbols of the X2 modulated symbols other than the M2 modulated symbols to occupy the second section (e.g., the region 908-$b$) of the PUSCH (e.g., the PUSCH 910).

Alternatively, in certain configurations (spatial layers), the mapping component 1512 maps a second part of the X2 modulated symbols to occupy a second section of the plurality of the sections of the PUSCH.

Figure 16:
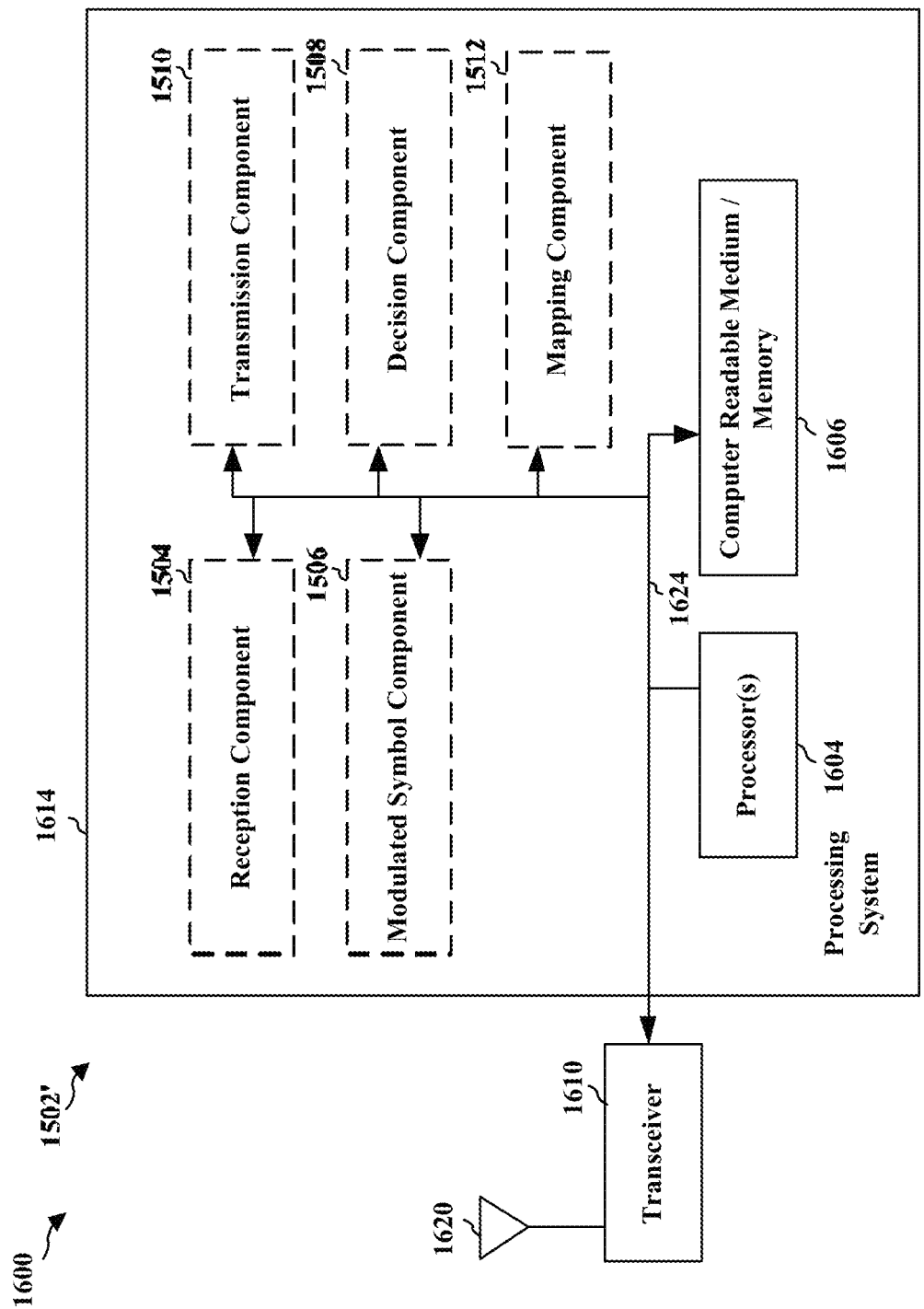
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The apparatus 1502' may be a UE. The processing system 1614 may be implemented with a bus architecture, represented generally by a bus 1624. The bus 1624 may include any number of interconnecting buses and bridges depending on the specific application of the processing system 1614 and the overall design constraints. The bus 1624 links together various circuits including one or more processors and/or hardware components, represented by one or more processors 1604, the reception component 1504, the modulated symbol component 1506, the decision component 1508, the transmission component 1510, the mapping component 1512, and a computer-readable medium/memory 1606. The bus 1624 may also link various other circuits such as timing sources, peripherals, voltage regulators, and power management circuits, etc.

The processing system 1614 may be coupled to a transceiver 1610, which may be one or more of the transceivers 254. The transceiver 1610 is coupled to one or more antennas 1620, which may be the communication antennas 252.

The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620.

The processing system 1614 includes one or more processors 1604 coupled to a computer-readable medium/ memory 1606. The one or more processors 1604 are responsible for general processing, including the execution of software stored on the computer-readable medium/memory 1606. The software, when executed by the one or more processors 1604, causes the processing system 1614 to perform the various functions described supra for any particular apparatus. The computer-readable medium/memory 1606 may also be used for storing data that is manipulated by the one or more processors 1604 when executing software. The processing system 1614 further includes at least one of the reception component 1504, the modulated symbol component 1506, the decision component 1508, the transmission component 1510, and the mapping component 1512. The components may be software components running in the one or more processors 1604, resident/stored in the computer readable medium/memory 1606, one or more hardware components coupled to the one or more processors 1604, or some combination thereof. The processing system 1614 may be a component of the UE 250 and may include the memory 260 and/or at least one of the TX processor 268, the RX processor 256, and the communication processor 259.

In one configuration, the apparatus 1502/apparatus 1502' for wireless communication includes means for performing each of the operations of FIG. 13 and FIG. 14. The aforementioned means may be one or more of the aforementioned components of the apparatus 1502 and/or the processing system 1614 of the apparatus 1502' configured to perform the functions recited by the aforementioned means.

As described supra, the processing system 1614 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    obtaining M1 modulated symbols to be transmitted on a selected section of a physical uplink shared channel (PUSCH) of the UE, the M1 modulated symbols being for carrying a first category of uplink information, M1 being an integer;
    mapping J1 modulated symbols of the M1 modulated symbols to occupy each one of J1 resource elements (REs) that are available, in a consecutive (N1−1) symbol periods of the selected section of the PUSCH, for carrying modulated symbols that carries the first category of uplink information, (N1−1) being a maximum integer that allows J1 to be smaller than M1, K1 being a difference between J1 and M1, J1, N1, and K1 each being an integer;
    determining a number S1 based on K1 and a number T1, T1 REs being available in a $N1^{th}$ symbol period of the selected section of the PUSCH for carrying modulated symbols that carries the first category of uplink information, the $N1^{th}$ symbol period being subsequent and consecutive to the consecutive (N1−1) symbol periods, S1 and T1 each being an integer;
    mapping K1 modulated symbols of the M1 modulated symbols to occupy K1 REs of the T1 REs such that two adjacent REs among the K1 REs being separated by at least (S1−1) REs;
    generating, at the UE, signals carrying the PUSCH; and
    transmitting, at the UE, the signals to a base station.

2. The method of claim 1, wherein the selected section of the PUSCH includes the entire PUSCH of the UE.

3. The method of claim 1, wherein S1 is an integer equal to or adjacent to (T1/K1).

4. The method of claim 1, further comprising: determining a location of the consecutive (N1−1) symbol periods based on a location of Demodulation Reference Signal (DMRS) in the selected section of the PUSCH.

5. The method of claim 4, wherein the location of the consecutive (N1−1) symbol periods is determined to start after a first burst of consecutive symbol periods occupied by Demodulation Reference Signals (DMRSs) in the selected section of the PUSCH.

6. The method of claim 1, further comprising:
    obtaining M2 modulated symbols for carrying a second category of uplink information M2 being an integer;

mapping J2 modulated symbols of the M2 modulated symbols to occupy each one of J2 resource elements (REs) that are available, in a consecutive (N2−1) symbol periods of the selected section of the PUSCH, for carrying modulated symbols that carries the second category of uplink information, (N2−1) being a maximum integer that allows J2 to be smaller than M2, an initial symbol period of the consecutive (N2−1) symbol periods being the N2$^{th}$ symbol period, K2 being the difference between J2 and M2, J2, N2, and K2 each being an integer;

determining a number S2 based on K2 and a number T2, T2 REs being available in a N2$^{th}$ symbol period of the selected section of the PUSCH for carrying modulated symbols that carries the second category of uplink information, the N2$^{th}$ symbol period being subsequent and consecutive to the consecutive (N2−1) symbol periods, S2 and T2 each being an integer;

mapping K2 modulated symbols of the M2 modulated symbols to occupy K2 REs of the T2 REs such that two adjacent REs among the K2 REs being separated by at least (S2−1) REs.

7. The method of claim 6, wherein the first category of uplink information has a priority higher than a priority of the second category of uplink information for being mapped to the REs of the PUSCH.

8. The method of claim 7, wherein the first category of uplink information and the second category of uplink information are two of:
an uplink acknowledgment or negative acknowledgment;
a first part of a channel state information (CSI) report;
a second part of a CSI report.

9. The method of claim 6, wherein S2 is an integer equal to or adjacent to (T2/K2).

10. The method of claim 6, wherein the PUSCH includes a first section of the PUSCH that spans a first part of a frequency range of the PUSCH and a second section of the PUSCH that spans a second part of the frequency range of the PUSCH, wherein the selected section of the PUSCH is one of the first section of the PUSCH and the second section of the PUSCH, wherein the first part of the frequency range does not overlap with the second part of the frequency range.

11. The method of claim 10, further comprising:
generating X1 modulated symbols that carry the first category of uplink information to be transmitted on the PUSCH, wherein the selected section of the PUSCH is the first section of the PUSCH, wherein the M1 modulated symbols are obtained from the X1 modulated symbols, X1 being an integer.

12. The method of claim 11, further comprising:
mapping modulated symbols of the X1 modulated symbols other than the M1 modulated symbols to occupy the second section of the PUSCH.

13. The method of claim 11, further comprising: wherein M1 is the minimum integer that is smaller than or equal to (X1/2).

14. The method of claim 11, further comprising: wherein M1 is the maximum integer that is greater than or equal to (X1/2).

15. The method of claim 10, further comprising:
generating X2 modulated symbols that carry the second category of uplink information to be transmitted on the PUSCH, wherein the selected section of the PUSCH is the first section of the PUSCH, wherein the M2 modulated symbols are obtained from the X2 modulated symbols, X2 being an integer.

16. The method of claim 15, further comprising:
mapping modulated symbols of the X2 modulated symbols other than the M2 modulated symbols to occupy the second section of the PUSCH.

17. The method of claim 15, further comprising: wherein M2 is the minimum integer that is smaller than or equal to (X2/2).

18. The method of claim 15, further comprising: wherein M2 is the maximum integer that is greater than or equal to (X2/2).

19. The method of claim 6, wherein the UE communicates on a plurality of spatial layers, wherein the PUSCH includes a plurality of sections on the plurality of spatial layers, respectively, wherein the selected section of the PUSCH is one of the plurality of sections of the PUSCH.

20. The method of claim 19, further comprising:
generating X1 modulated symbols that carry the first category of uplink information to be transmitted on the PUSCH, wherein the selected section of the PUSCH is a first section of the plurality of the sections of the PUSCH, wherein the M1 modulated symbols are a first part of the X1 modulated symbols.

21. The method of claim 20, further comprising:
mapping a second part of the X1 modulated symbols to occupy a second section of the plurality of the sections of the PUSCH.

22. The method of claim 19, further comprising:
generating X2 modulated symbols that carry the second category of uplink information to be transmitted on the PUSCH, wherein the selected section of the PUSCH is a first section of the plurality of the sections of the PUSCH, wherein the M2 modulated symbols are a first part of the X2 modulated symbols.

23. The method of claim 22, further comprising:
mapping a second part of the X2 modulated symbols to occupy a second section of the plurality of the sections of the PUSCH.

24. An apparatus for wireless communication, the apparatus being a user equipment (UE), comprising:
a memory; and
at least one processor coupled to the memory and configured to:
obtain M1 modulated symbols to be transmitted on a selected section of a physical uplink shared channel (PUSCH) of the UE, the M1 modulated symbols being for carrying a first category of uplink information, M1 being an integer;
map J1 modulated symbols of the M1 modulated symbols to occupy each one of J1 resource elements (REs) that are available, in a consecutive (N1−1) symbol periods of the selected section of the PUSCH, for carrying modulated symbols that carries the first category of uplink information, (N1−1) being a maximum integer that allows J1 to be smaller than M1, K1 being a difference between J1 and M1, J1, N1, and K1 each being an integer;
determine a number S1 based on K1 and a number T1, T1 REs being available in a N1$^{th}$ symbol period of the selected section of the PUSCH for carrying modulated symbols that carries the first category of uplink information, the N1$^{th}$ symbol period being subsequent and consecutive to the consecutive (N1−1) symbol periods, S1 and T1 each being an integer;
map K1 modulated symbols of the M1 modulated symbols to occupy K1 REs of the T1 REs such that two adjacent REs among the K1 REs being separated by at least (S1−1) REs;

generate, at the UE, signals carrying the PUSCH; and
transmit, at the UE, the signals to a base station.

25. A non-transitory computer-readable medium storing computer executable code for wireless communication of a user equipment (UE), comprising code to:
- obtain M1 modulated symbols to be transmitted on a selected section of a physical uplink shared channel (PUSCH) of the UE, the M1 modulated symbols being for carrying a first category of uplink information, M1 being an integer;
- map J1 modulated symbols of the M1 modulated symbols to occupy each one of J1 resource elements (REs) that are available, in a consecutive (N1−1) symbol periods of the selected section of the PUSCH, for carrying modulated symbols that carries the first category of uplink information, (N1−1) being a maximum integer that allows J1 to be smaller than M1, K1 being a difference between J1 and M1, J1, N1, and K1 each being an integer;
- determine a number S1 based on K1 and a number T1, T1 REs being available in a $N1^{th}$ symbol period of the selected section of the PUSCH for carrying modulated symbols that carries the first category of uplink information, the $N1^{th}$ symbol period being subsequent and consecutive to the consecutive (N1−1) symbol periods, S1 and T1 each being an integer;
- map K1 modulated symbols of the M1 modulated symbols to occupy K1 REs of the T1 REs such that two adjacent REs among the K1 REs being separated by at least (S1−1) REs;
- generate, at the UE, signals carrying the PUSCH; and
- transmit, at the UE, the signals to a base station.

* * * * *